US006961652B2

(12) United States Patent
Amano

(10) Patent No.: US 6,961,652 B2
(45) Date of Patent: Nov. 1, 2005

(54) CONTROL APPARATUS FOR AN INTERNAL COMBUSTION ENGINE

(75) Inventor: Isao Amano, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/900,465

(22) Filed: Jul. 28, 2004

(65) Prior Publication Data

US 2005/0027430 A1 Feb. 3, 2005

(30) Foreign Application Priority Data

Jul. 28, 2003 (JP) ....................................... 2003-280963

(51) Int. Cl.[7] ........................... F02P 3/045; F02D 45/00

(52) U.S. Cl. .................. 701/105; 73/117.3; 123/406.53

(58) Field of Search ................................ 701/105, 113, 701/102, 115; 73/117.3; 123/406.53, 406.58

(56) References Cited

U.S. PATENT DOCUMENTS 5,433,107 A * 7/1995 Angermaier et al. ....... 73/117.3
6,334,094 B1 * 12/2001 Hirakata et al. ........... 73/117.3
6,411,917 B1 * 6/2002 Hirakata et al. ............ 702/145
6,560,558 B2 * 5/2003 Hirakata et al. ............ 702/145

FOREIGN PATENT DOCUMENTS

JP 56-75963 6/1981
JP 62-150075 7/1987
JP 5-18339 1/1993
JP 08-338349 12/1996
JP 10-141130 A * 5/1998 ........... F02D/45/00
JP 2003-120400 A * 4/2003 ........... F02D/45/00

* cited by examiner

*Primary Examiner*—Hieu T. Vo
(74) *Attorney, Agent, or Firm*—Nixon & Vanderhye P.C.

(57) ABSTRACT

A microcomputer calculates a requisite time for controlling a predetermined device of an internal combustion engine. The microcomputer estimates time required for a crank shaft of the engine to rotate from a present crank angle to a designated crank angle. The microcomputer predicts a relationship between times required for the crank shaft to rotate consecutive angular regions positioned before and after the present crank angle based on measurement result with respect to times required for the crank shaft to rotate consecutive angular regions positioned before and after a preceding crank angle advanced a predetermined amount from the present crank angle.

21 Claims, 12 Drawing Sheets

FIG. 9

| 30CA TIME (ms) | CORRECTION VALUE FOR 30CA TIME | | | | | |
|---|---|---|---|---|---|---|
| | B100-70 | B70-40 | B40-10 | B10-A20 | A20-50 | A50-80 |
| 100 | 1.2 | 1.2 | 2 | 0.8 | 0.6 | 1.7 |
| 80 | 1.16 | 1.2 | 1.8 | 0.84 | 0.6 | 1.5 |
| 60 | 1.12 | 1.2 | 1.6 | 0.88 | 0.6 | 1.3 |
| 40 | 1.08 | 1.2 | 1.4 | 0.92 | 0.6 | 1.1 |
| 20 | 1.04 | 1.2 | 1.2 | 0.96 | 0.6 | 0.9 |
| 10 | 1.02 | 1.1 | 1.1 | 0.98 | 0.8 | 0.8 |

CONTROL APPARATUS FOR AN INTERNAL COMBUSTION ENGINE

BACKGROUND OF THE INVENTION

This application is based upon and claims the benefit of priority of the prior Japanese Patent Application 2003-280963 filed on Jul. 28, 2003.

The present invention relates to a control apparatus for an internal combustion engine that calculates a requisite time required for a crank shaft of an internal combustion engine to rotate from a present crank angle to a designated crank angle where the control apparatus controls a predetermined device of this engine.

For example, Japanese Patent Application Laid-open No. 08-338349 (1996) discloses a conventional control apparatus for an internal combustion engine that variably controls power supply time for ignition coils in an ignition device in accordance with driving conditions of the internal combustion engine. More specifically, the control apparatus changes the power supply time for the ignition coil in accordance with the temperature of the ignition coil. This is effective in assuring proper ignition performance regardless of temperature changes occurring in the ignition coils, as well as in ensuring a long life for respective transistors that control the output of ignition coils.

The above-described ignition device controls the power supply time for determining the current supplied to each ignition coil and also controls an ignition timing at which the current supplied to the coil is stopped. More specifically, the ignition timing is set to a predetermined timing. The power supply to each ignition coil starts from a timing advanced a required power supply time from the predetermined ignition timing. The power supply to each ignition coil terminates at the ignition timing. The ignition timing is designated as a crank angle. A crank shaft of the engine rotates from the present crank angle to a crank angle corresponding to the ignition timing. A requisite time is calculated as a time required for the crank shaft to rotate from the present crank angle to the crank angle corresponding to the ignition timing. Usually, the requisite time is calculated with reference to past rotational speeds of the crank angle. The requisite time being thus calculated will be adversely effected by changes of the rotational speed of the crank shaft, occurring due to acceleration, deceleration, combustion cycle, or the like of an internal combustion engine. In view of the above, to accurately perform the ignition timing control, the control apparatus for a conventional internal combustion engine gives a sufficient margin for the above-described power supply time. In other words, the conventional engine control is the one giving priority to the ignition timing control.

Hereinafter, setting of the above margin will be explained with reference to FIGS. 14 and 15. FIG. 14 shows a conventional ignition timing control in an accelerating condition. FIG. 15 shows a conventional ignition timing control in a decelerating condition. In each of FIGS. 14 and 15, (a) represents a crank signal, (b) represents a calculated ignition output at a crank angle BTDC70, (c) represents a calculated ignition output at a crank angle BTDC40, and (d) represents a current value supplied to an ignition coil. In this description, BTDC stands for 'before top dead center'.

In each of FIG. 14 and FIG. 15, the ignition timing is assumed to be in a crank angle range from BTDC40 to BTDC10. As shown in FIGS. 14(*b*), 14(*c*), 15(*b*), and 15(*c*), the ignition timing and the power supply start time for predetermined crank angles BTDC70 and BTDC40 are calculated based on measured times $\alpha$ and $\beta$ required for the crank shaft to rotate a preceding 180 CA (crank angle). In this case, accurately executing the above-described ignition timing control is feasible by calculating the ignition timing at the crank angle of BTDC40. Meanwhile, calculating the ignition timing at the crank angle BTDC70 is effective in assuring a sufficient power supply time.

As shown in FIG. 14, when the internal combustion engine is in the accelerating condition, the measured time $\beta$ is shorter than the measured time $\alpha$. The measured time $\alpha$ is used for calculating the ignition timing at the crank angle BTDC70. The measured time $\beta$ is used for calculating the ignition timing at the crank angle BTDC40. The ignition timing being newly set at the crank angle BTDC40 is earlier than the ignition timing being effective at the crank angle BTDC70. As a result, the power supply time becomes short. Under such circumstances, a margin is necessary to secure a sufficient power supply time. However, setting the margin considering these circumstances will raise a problem in the decelerating condition shown in FIG. 15 such that the power supply time becomes excessively long compared with a proper power supply time.

Regarding the power supply amount (i.e. required current pulse width) for an ignition coil, there is a lower limit and an upper limit as shown in FIGS. 14 and 15. Elongating the power supply time as described above may cause a problem such that the current supplied to the ignition coil may exceed a required current pulse width. Accordingly, in the case that the current supplied to the ignition coil exceeds the required current pulse width, the current supplied to the ignition coil is regulated by a specific hardware (e.g., regulator). However, the above-described required current pulse width is dependent on characteristics of each ignition coil. It will be necessary to develop the regulators so as to suit individual ignition coils. The cost for manufacturing the control apparatus will increase. A long developing time will be required for the control apparatus.

Furthermore, the surplus of regulated current is converted into thermal energy. The temperature of a portion positioned adjacent to the regulator will increase. Especially, a control apparatus incorporating an ignition module will produce a significant amount of heat from the ignition module which serves as a heat generating source. Suppressing the temperature increase is an important issue to be attained in designing the control apparatus.

Besides the above-described ignition timing control, the conventional control apparatus cannot accurately calculate a requisite time required for the crank shaft to rotate from the present crank angle to a designated crank angle where the control apparatus controls a predetermined device of the engine.

SUMMARY OF THE INVENTION

In view of the above-described problems, the present invention has an object to provide a control apparatus for an internal combustion engine that can accurately calculate a requisite time required for the crank shaft of an internal combustion engine to rotate from the present crank angle to a designated crank angle where the control apparatus controls a predetermined device of the engine.

In order to accomplish the above and other related objects, the present invention provides a first control apparatus for an internal combustion engine including a measuring means and a calculating means. The measuring means of the first control apparatus measures a time required for a predetermined rotation of the crank shaft based on a crank signal representing the crank angle. The calculating means of the first control apparatus calculates the requisite time by predicting a relationship between times required for the crank shaft to rotate consecutive angular regions positioned before and after the present crank angle based on measurement results obtained by the measuring means with respect to times required for the crank shaft to rotate consecutive angular regions positioned before and after a preceding crank angle advanced a predetermined amount from the present crank angle.

In general, the rotational speeds of the crank shaft in the angular regions positioned before and after a predetermined crank angle do not always agree with each other. The rotational speed of the crank shaft momentarily changes due to various factors, such as characteristics of combustion cycle, acceleration and deceleration of an internal combustion engine, characteristics of a crank shaft rotational speed sensor, and the combustion efficiency differences of respective cylinders.

The measuring means obtains measurement results with respect to the times required for the crank shaft to rotate consecutive angular regions positioned before and after the preceding crank angle advanced a predetermined amount from the present crank angle. This measurement result contains information relating to the relationship between rotational speeds of the crank shaft in consecutive angular regions positioned before and after the preceding crank angle advanced a predetermined amount from the present crank angle.

The relationship between rotational speeds of the crank shaft in consecutive angular regions positioned before and after the preceding crank angle advanced the above-described predetermined amount from the present crank angle is believed to be similar to the relationship between rotational speeds of the crank shaft in consecutive angular regions positioned before and after the present crank angle. Therefore, based on the above-described measurement result, it is possible to predict a mutual relationship between times required for the crank shaft to rotate consecutive angular regions positioned before and after the present crank angle. Accordingly, the present invention enables the first control apparatus to calculate the above-described requisite time with reference to some of the above-described various factors causing variations.

Furthermore, in order to accomplish the above and other related objects, the present invention provides a second control apparatus for an internal combustion engine that includes a measuring means and a calculating means. The measuring means of the second control apparatus measures a time required for a predetermined rotation of the crank shaft based on a crank signal representing the crank angle. The calculating means of the second control apparatus calculates the requisite time based on measurement result obtained by the measuring means. The measurement result includes first to third time information. The first time information represents a time required for the crank shaft to rotate a first angle ending at a preceding crank angle that is advanced a predetermined amount from the present crank angle. The second time information represents a time required for the crank shaft to rotate a second angle starting from the preceding crank angle and corresponding to a rotation from the present crank angle to the designated crank angle. And, the third time information represents a time required for the crank shaft to rotate a third angle corresponding to the first angle and ending at the present crank angle.

In general, the rotational speed of the crank shaft in the above third angle ending at the present crank angle is not always equal to the rotational speed of the crank shaft in the angular region starting from the present crank angle and ending at the designated crank angle. The rotation of the crank shaft momentarily varies due to various factors, such as characteristics of combustion cycle, acceleration and deceleration of an internal combustion engine, characteristics of a crank shaft rotational speed sensor, and combustion efficiency differences of respective cylinders.

On the contrary, according to the above-described arrangement of the second control apparatus of the present invention, the above-described first time information and the second time information are used in calculating the requisite time. More specifically, the second control apparatus of the present invention refers to the relationship between the first time information and the second time information, to estimate a mutual relationship between the rotational speed of the crank shaft in the third angle ending at the present crank angle and the rotational speed of the crank shaft in the angular region starting from the present crank angle and ending at the designated crank angle. The first time information involves rotational changes occurring when the crank shaft rotates the first angle ending at the preceding crank angle that is advanced a predetermined amount from the present crank angle. The second time information involves rotational changes occurring when the crank shaft rotates the second angle starting from the preceding crank angle and corresponding to the rotation from the present crank angle to the designated crank angle. Furthermore, the second control apparatus of the present invention refers to the relationship between the first time information and the third time information, to obtain the mutual relationship between the rotational speed of the crank shaft in the third angle ending at the present crank angle and the rotational speed of the crank shaft in the angular region starting from the present crank angle and ending at the designated crank angle. The third time information involves rotational changes occurring when the crank shaft rotates the third angle ending at the present crank angle.

The first angle and the second angle are continuous with each other and positioned before and after the preceding crank angle which is advanced a predetermined amount from the present crank angle. The second angle corresponds to an angular region from the present crank angle to the designated crank angle. The third angle corresponds to the first angle. The third angle is equal in size with the first angle and is positioned just before the present crank angle.

Accordingly, the second control apparatus of the present invention uses a total of three kinds of, i.e. first to third, time information to estimate the rotational speed of the crank shaft in an angular region from the present crank angle to the designated crank angle. In other words, the second control apparatus of the present invention estimates a mutual relationship between the third time information and the requisite time required for the crank shaft to rotate from the present crank angle to the designated crank angle, with reference to the mutual relationship between the first time information and the second time information.

The estimation performed in this manner by the second control apparatus of the present invention takes account of the rotational changes occurring when the crank shaft rotates the first angle ending at the preceding crank angle, when the crank shaft rotates the second angle starting from the preceding crank angle and corresponding to a rotation from the present crank angle to the designated crank angle, and when the crank shaft rotates the third angle ending at the present crank angle. In other words, this estimation involves the estimation about the rotational changes occurring when the crank shaft rotates from the present crank angle to the designated crank angle. According to the above-described arrangement of the second control apparatus of the present invention, it is possible to accurately calculate the requisite time required for the crank shaft of an internal combustion engine to rotate from the present crank angle to the designated crank angle based on the above-described three, i.e. first to third, time information. The second control apparatus of the present invention controls a designated device of the engine at this designated crank angle.

The quantification with respect to rotational speeds of the crank shaft corresponding to the first time information and the second time information can be defined as a ratio of the first time information to the second time information. The quantification with respect to rotational speeds of the crank shaft corresponding to the first time information and the third time information can be defined as a ratio of the first time information to the third time information. The estimated requisite time can be expressed as (second time information/first time information)×third time information.

Preferably, the second control apparatus for an internal combustion engine of the present invention further includes a means for executing a fuel cut control. When the fuel cut control is executed, the calculating means prohibits obtaining new time information from the measuring means and retains the first time information and the second time information which are obtained before executing the fuel cut control.

There is no combustion in an engine during the fuel cut operation, and accordingly no rotational changes of the crank shaft will occur due to combustion conditions. The measurement result obtained by the measuring means during the fuel cut control is different in characteristics from that obtained when no fuel cut control is executed. If the above-described time information is obtained during the fuel cut control, it will be difficult to accurately calculate the requisite time when the fuel injection operation resumes.

The second control apparatus of the present invention can retain the time information obtained before executing the fuel cut control. Thus, according to the above preferred arrangement, the second control apparatus of the present invention can accurately calculate the requisite time when the fuel injection operation resumes considering the rotational changes resulting from unstable combustion conditions.

Preferably, the preceding crank angle advanced a predetermined amount from the present crank angle is a crank angle leading the present crank angle by an amount equivalent to M times (M is a predetermined integer) an angular offset between top dead centers of respective cylinders of the engine.

The top dead center represents the condition of a piston positioned at the uppermost end in each cylinder of the engine. The angular offset between top dead centers of respective cylinders of the engine reflects the angular offset between combustion cycles of respective cylinders. According to the above preferred arrangement, the control apparatus of the present invention can accurately calculate the requisite time considering rotational changes resulting from different combustion cycles. Preferably, the preceding crank angle advanced a predetermined amount from the present crank angle is a crank angle leading the present crank angle by an amount equivalent to M×360 CA (M is a predetermined integer).

The above-described variations in the rotation of the crank shaft may derive from characteristics of a sensing means for detecting the crank angle (e.g. manufacturing errors of detecting teeth provided on the crank shaft). Such variations occur at the intervals of 360° (crank angle).

According to the above preferred arrangement, the control apparatus of the present invention can accurately calculate the requisite time considering the characteristics of a sensing means for detecting the crank angle.

Preferably, the preceding crank angle advanced a predetermined amount from the present crank angle is a crank angle leading the present crank angle by an amount equivalent to M×720 CA (M is a predetermined integer). The above-described variations in the rotation of the crank shaft may result from combustion efficiency differences between respective cylinders. Such variations occur at the intervals of 720° (crank angle).

According to the above preferred arrangement, the control apparatus of the present invention can accurately calculate the requisite time considering the combustion efficiency differences between respective cylinders, Preferably, the measuring means measures a time required for each equiangular rotation of the crank shaft. The calculating means successively calculates a ratio of times of consecutive equiangular rotations of the crank shaft which are time sequentially measured. And, the calculating means calculates the requisite time based on the ratio of times being successively calculated as well as a time required for the equiangular rotation of the crank shaft ending at the present crank angle.

The control apparatus of the present invention successively obtains the ratio of the times of consecutive equiangular rotations of the crank shaft which are time sequentially measured. The control apparatus of the present invention obtains the time required for the equiangular rotation of the crank shaft ending at the present crank angle. The control apparatus of the present invention can estimate a requisite time required for an equiangular rotation of the crank shaft starting from the present crank angle based on the already obtained ratio and the time.

Accordingly, the control apparatus of the present invention can estimate the requisite time considering the past rotational changes of the crank shaft, because the control apparatus of the present invention obtains the ratio of times of consecutive equiangular rotations of the crank shaft positioned before and after the preceding crank angle advanced the above-described predetermined amount from the present crank angle. Furthermore, the control apparatus of the present invention successively can obtain several ratios of the times of consecutive equiangular rotations of the crank shaft positioned before and after succeeding crank angles. Finally, the control apparatus of the present invention obtains the time required for the equiangular rotation of the crank shaft ending at the present crank angle. Thus, the control apparatus of the present invention can accurately estimate the requisite time required for a next-coming equiangular rotation of the crank shaft starting from the present crank angle based on the already obtained ratio and the time.

Preferably, the calculating means stores data defining a relationship between a time required for each equiangular rotation of the crank shaft in a startup condition of the engine that is measured by the measuring means and a predicted time required for the next equiangular rotation of the crank shaft. And, the calculating means calculates the requisite time based on a time required for the equiangular rotation of the crank shaft ending at the present crank angle as well as the data when the engine is in the startup condition.

When an internal combustion engine is in the startup condition, the rotational speed of the crank shaft greatly changes. It is difficult to accurately predict the time required for the next equiangular rotation of the crank shaft starting from the present crank angle based on the measurement result obtained by the measuring means.

According to the above preferred arrangement, the control apparatus of the present invention can use the above-described stored data and therefore can properly predict the time required for the next equiangular rotation of the crank shaft starting from the present crank angle even if the engine is in the startup condition. The control apparatus of the present invention can thus accurately calculate the requisite time.

Preferably, the calculating means calculates the requisite time with reference to at least one factor selected from the group consisting of a temperature of cooling water used for cooling the engine, a voltage of a battery supplying electric power to a starter used in the startup condition of the engine, and an electric power charged in the battery.

In the startup condition of an internal combustion engine, especially when an ambient temperature is low, the crank shaft rotates with great friction. The rotational changes of the crank shaft greatly depend on the warm-up condition of the engine. Furthermore, in the startup condition of an internal combustion engine, the rotational conditions of the crank shaft greatly depend on the voltage of a battery supplying electric power to the starter. Furthermore, the battery voltage reduces in response to activation of the starter. The reduction of the battery voltage depends on the state of charge. Thus, in the startup condition of an internal combustion engine, the rotational conditions of the crank shaft greatly depend on the electric power charged in the battery.

In this respect, according to the above preferred arrangement, the control apparatus of the present invention can accurately calculate the requisite time considering the temperature of cooling water indicating the warm-up condition of the engine, the battery voltage, and the state of charge.

In calculating the requisite time by using the above-described data, calculation accuracy is dependent on a motor capacity of the starter and a compression ratio of the internal combustion engine. It is therefore preferable to provide a correcting means for correcting the requisite time. The correcting means prepares the above-described data beforehand as fundamental data and then corrects the fundamental data so as to suit for a starter equipped in an automotive vehicle installing this control apparatus and a compression ratio of the internal combustion engine. This is effective in improving the applicability of such fundamental data.

Preferably, the predetermined device is an ignition device and the designated crank angle is set to a cutoff timing at which the control apparatus stops a power supply control for this ignition device.

According to the ignition device, the cutoff timing of a power supply control is an ignition timing (closed-angle control timing). This is a parameter to be controlled accurately for an internal combustion engine. According to the above preferred arrangement, the control apparatus of the present invention executes the ignition timing control based on the calculation result of the above-described requisite time and accordingly can accurately execute the ignition timing control.

Preferably, the requisite time is not calculated again after the power supply control resumes at a predetermined timing determined based on the cutoff timing of the power supply control.

If the calculation of the requisite time is executed again after the power supply control resumes, the power supply time may slightly change. Therefore, calculating the requisite time again upon re-starting the power supply control may cause failure in supplying a sufficient amount of current for ignition. To eliminate such a drawback, it may be possible to give a large margin for the supplied current amount. However, it is not desirable in that the supplied current amount cannot be set to an appropriate value.

In this respect, according to the above preferred arrangement, the control apparatus of the present invention does not calculate the requisite time again after the power supply control resumes. This enables the control apparatus of the present invention to accurately calculate requisite time and also set the power supply time to an appropriate timing.

It is preferable that the calculation interval for the power supply time is set to be shorter during the startup condition of the engine.

Preferably, the predetermined device is a fuel injection apparatus and the designated crank angle is set to an injection termination timing of the fuel injection apparatus.

For example, when the fuel is injected into an intake port of an internal combustion engine, it is known that the combustion efficiency can be optimized by completing the fuel injection slightly before the intake stroke begins. In this respect, the termination timing of fuel injection is an important factor in optimizing the fuel injection.

In this respect, according to the above preferred arrangement, the control apparatus of the present invention can accurately calculate the termination timing of fuel injection.

BRIEF DESCRIPTION OF THE DRAWINGS

The above and other objects, features and advantages of the present invention will become more apparent from the following detailed description which is to be read in conjunction with the accompanying drawings, in which:

FIG. 9 is a table showing data used for an ignition timing control apparatus for an internal combustion engine in accordance with a second embodiment of the present invention;

DESCRIPTION OF THE PREFERRED EMBODIMENTS

Preferred embodiments of the present invention will be explained hereinafter with reference to attached drawings.

First Embodiment

Hereinafter, a first embodiment of the present invention will be explained based on an ignition timing control apparatus which serves as a control apparatus for an internal combustion engine of the present invention.

Figure 1:
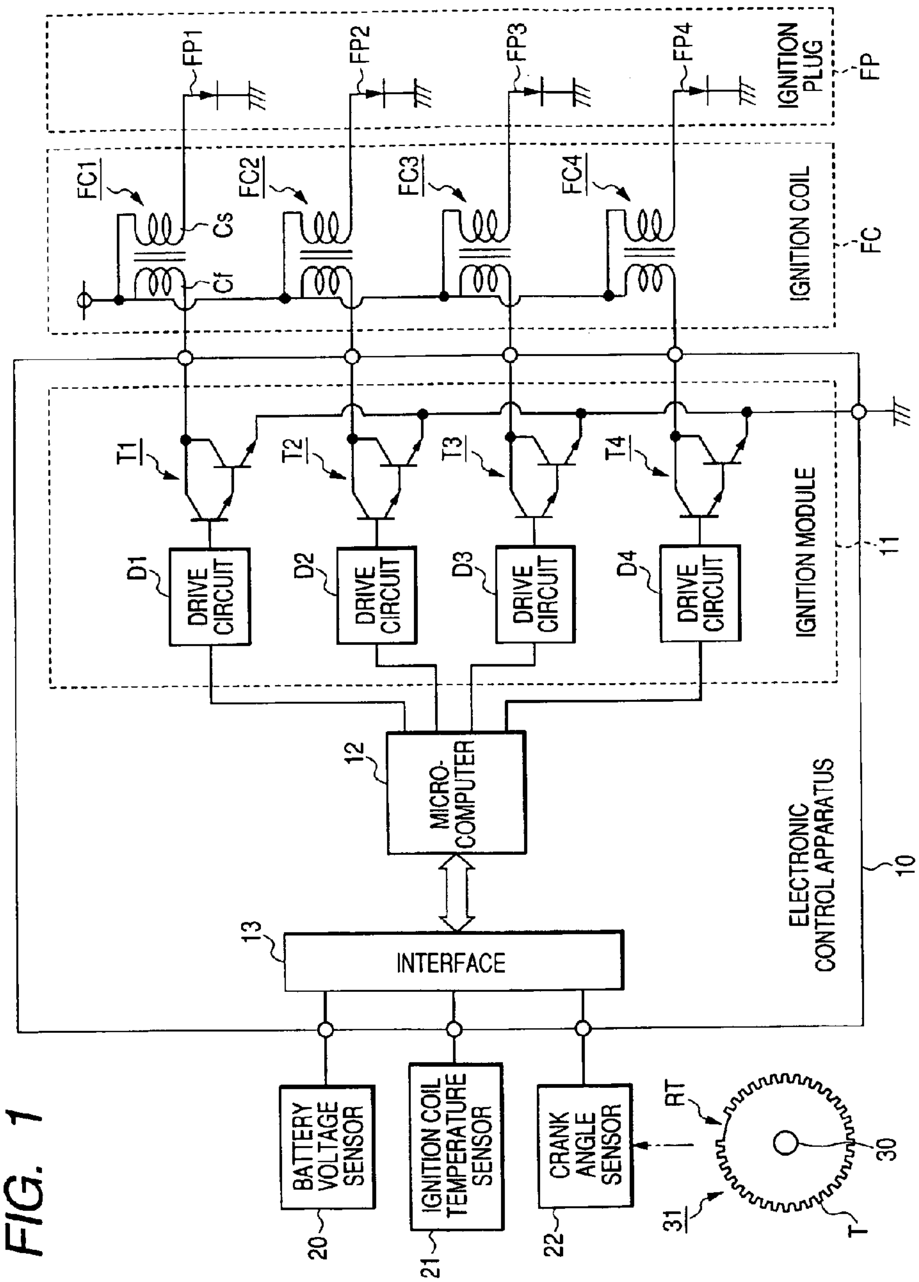
FIG. 1 is a circuit diagram showing an arrangement of an ignition timing control apparatus for an internal combustion engine in accordance with a first embodiment of the present invention.

FIG. 1 shows an arrangement of this embodiment that is provided for controlling a 4-cylinder internal combustion engine. The internal combustion engine includes four, i.e. first to fourth, cylinders which are equipped with ignition plugs FP1 to FP4, respectively. Ignition coils FC1 to FC4 generate voltages to control the corresponding ignition plugs FP1 to FP4, respectively. Each of the ignition coils FC1 TO FC4 includes a primary coil Cf and a secondary coil Cs. When electric power is supplied to the primary coil Cf, the secondary coil Cs generates a voltage that is applied to a corresponding ignition plug.

An electronic control apparatus 10 controls electric power supplied to respective ignition coils FC1 to FC4 (more specifically, to respective primary coils Cf). The electronic control apparatus 10 includes an ignition module 11, a microcomputer 12, and an interface 13. The ignition module 11 is a hardware arranged for controlling respective ignition coils FC1 to FC4. The microcomputer 12 executes various calculation processing required for the ignition control. The interface 13 intervenes for signal transmission between the microcomputer 12 and external devices.

The ignition module 11 includes transistors T1 to T4 and drive circuits D1 to D4 corresponding to respective ignition coils FC1 to FC4. Respective drive circuits D1 to D4 control associated transistors T1 to T4 in response to command signals supplied from the microcomputer 12. Respective ignition coils FC1 to FC4 (more specifically, their primary coils Cf) receive current from an electric power source in response to turning on and off operation of corresponding transistors T1 to T4. The current value supplied to respective ignition coils FC1 to FC4 (more specifically, their primary coils Cf) immediately before stopping power supply determines a voltage value produced from respective ignition coils FC1 to FC4 (more specifically, their secondary coils Cs). Therefore, the microcomputer 12 adjusts an operation amount of the ignition module 11 to control the voltage value applied to respective ignition plugs FP1 to FP4.

To execute the above and other controls, the electronic control apparatus 10 inputs detection signals supplied from a battery voltage sensor 20 detecting a battery voltage, an ignition coil temperature sensor 21 detecting the temperature of the ignition coil, and a crank angle sensor 22 detecting rotational conditions of a crank shaft 30 of an internal combustion engine.

The crank angle sensor 22 is an electromagnetic type that outputs a crank signal produced due to electromagnetic induction occurring between detection teeth of a rotating timing rotor 31 and a core of the crank angle sensor 22. As shown in FIG. 1, the detection teeth T are provided at equal intervals, e.g. 10 degrees, along the circumferential periphery of the timing rotor 31. This interval corresponds to an equiangular rotation of the crank shaft. There is a toothless portion RT having a width equivalent to two teeth. The toothless portion RT of the timing rotor 31 is used for discriminating each cylinder.

The electronic control apparatus 10 executed the ignition timing control in the following manner. The ignition timing control includes two fundamental steps; i.e. step S1 for calculating a requisite time required for the crank shaft 30 to rotate from a present crank angle detected by the crank angle sensor 22 to an ignition timing (defined as a crank angle) determined by the control of an internal combustion engine, and step S2 for calculating a power supply start timing which represents a start timing from which electric power is supplied to the ignition coil FC. The power supply start timing is obtained by subtracting a power supply time from the above requisite time. The power supply time represents a time during which electric power is supplied to the ignition coil FC. The power supply time is determined based on driving conditions of the internal combustion engine. The crank angle is converted into a comparable time with reference to measurement result of a time required for the crank shaft to rotate a predetermined crank angle, in the following manner.

Figure 2:
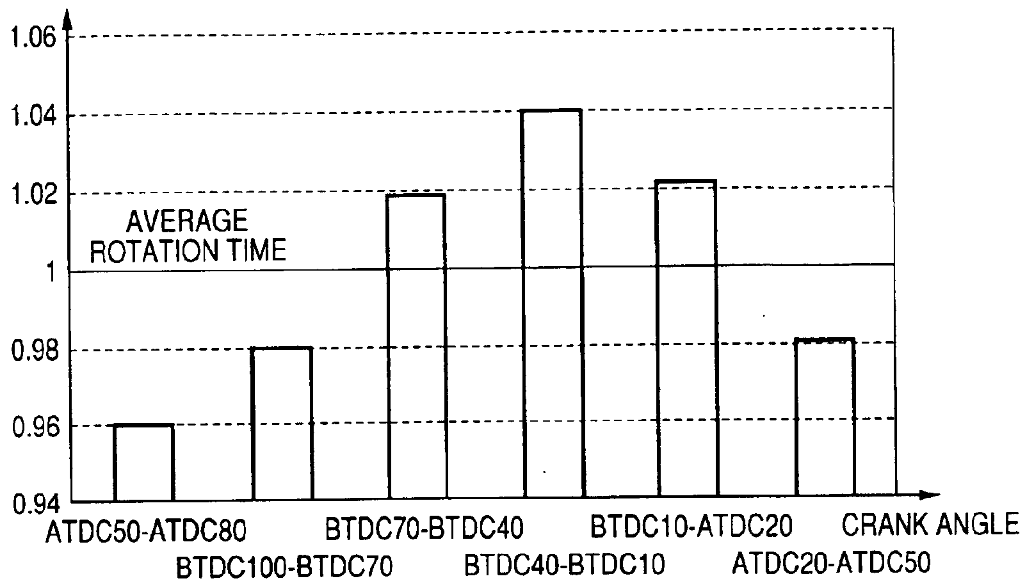
FIG. 2 is a graph showing rotational changes of a crank shaft of a 4-cylinder internal combustion engine.

FIG. 2 shows a time required for the crank shaft 30 to rotate each 30 CA (i.e. crank angle) in the units of crank angle. As understood from FIG. 2, the required time (i.e. a rotational speed of the crank shaft 30) varies in respective crank angle sections. More specifically, as shown in FIG. 2, the crank shaft 30 rotates at higher rotational speeds in a crank angle section "ATDC20-BTDC70" and at lower rotational speeds in a crank angle section "BTDC70-ATDC20." According to the combustion cycle of an internal combustion engine, the ignition plug FP ignites the atomized fuel in the combustion chamber. The rotational speed of crank shaft 30 accelerates during the combustion stroke. The rotational speed of crank shaft 30 decelerates in the compression stroke succeeding the combustion stroke.

The rotational changes of crank shaft 30 result from such characteristics of the combustion cycle as well as from acceleration and deceleration of an engine, manufacturing errors of detection teeth T, and combustion efficiency differences of respective cylinders.

Such rotational changes occurring in the crank shaft 30 should be considered in calculating the requisite time. This embodiment measures times required for the crank shaft 30 to rotate consecutive angular regions positioned before and after a preceding crank angle advanced a predetermined amount from the present crank angle. Then, based on this measurement result, this embodiment predicts a relationship between times required for the crank shaft 30 to rotate consecutive angular regions positioned before and after the present crank angle. More specifically, this embodiment obtains the following three, first to third, time information with respect to the time required for the rotation of crank shaft 30. The first time information represents a time required for the crank shaft 30 to rotate a first angle ending at a preceding crank angle that is advanced a predetermined amount from the present crank angle. The second time information represents a time required for the crank shaft 30 to rotate a second angle starting from the preceding crank angle and corresponding to a rotation from the present crank angle to the designated crank angle (i.e. ignition timing). And, the third time information represents a time required for the crank shaft 30 to rotate the third angle corresponding to the first angle and ending at the present crank angle.

The first time information and the second time information are used in calculating the requisite time. More specifically, this embodiment refers to the relationship between the first time information and the second time information, to estimate a mutual relationship between the rotational speed of the crank shaft 30 in the third angle ending at the present crank angle and the rotational speed of the crank shaft 30 in the angular region starting from the present crank angle and ending at the designated crank angle (i.e. ignition timing). The first time information involves rotational changes occurring when the crank shaft 30 rotates the first angle ending at the preceding crank angle that is advanced a predetermined amount from the present crank angle. The second time information involves rotational changes occurring when the crank shaft 30 rotates the second angle starting from the preceding crank angle and corresponding to the rotation from the present crank angle to the designated crank angle (i.e. ignition timing). Furthermore, this embodiment refers to the relationship between the first time information and the third time information, to obtain the mutual relationship between the rotational speed of the crank shaft 30 in the third angle ending at the present crank angle and the rotational speed of the crank shaft 30 in the angular region starting from the present crank angle and ending at the designated crank angle (i.e. ignition timing). The third time information involves rotational changes occurring when the crank shaft 30 rotates the third angle ending at the present crank angle.

Accordingly, this embodiment uses a total of three kinds of, i.e. first to third, time information to estimate the rotational speed of the crank shaft 30 in an angular region starting from the present crank angle and ending at the designated crank angle (i.e. ignition timing). In other words, this embodiment estimates a mutual relationship between the third time information and the requisite time required for the crank shaft 30 to rotate from the present crank angle to the designated crank angle (i.e. ignition timing), with reference to the mutual relationship between the first time information and the second time information.

The estimation performed in this embodiment takes account of the rotational changes occurring when the crank shaft 30 rotates the first angle ending at the preceding crank angle, when the crank shaft 30 rotates the second angle starting from the preceding crank angle and corresponding to the rotation from the present crank angle to the designated crank angle (i.e. ignition timing), and when the crank shaft 30 rotates the third angle ending at the present crank angle. In other words, this estimation involves the estimation about the rotational changes occurring when the crank shaft 30 rotates from the present crank angle to the designated crank angle (i.e. ignition timing).

According to this embodiment, it is possible to accurately calculate the requisite time required for the crank shaft 30 of an internal combustion engine to rotate from the present crank angle to the designated crank angle (i.e. ignition timing) based on the above-described three, i.e. first to third, time information.

Figure 3:
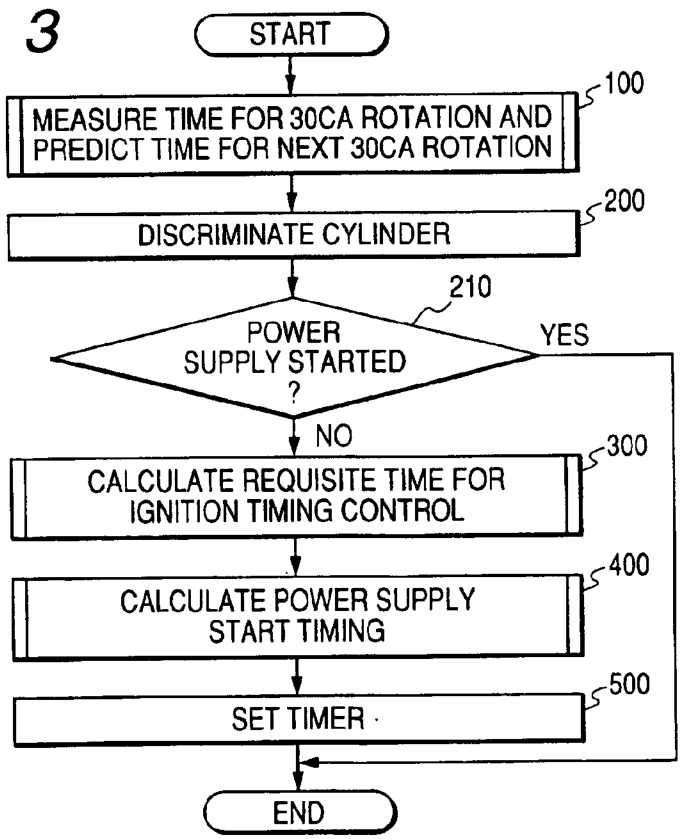
FIG. 3 is a flowchart showing processing procedure of an ignition timing control in accordance with the first embodiment of the present invention.

FIGS. 3 to 7 are flowcharts explaining the ignition timing control procedure according to this embodiment. FIG. 3 is a flowchart showing an overall procedure for the ignition timing control periodically performed by the microcomputer 12 at the intervals of 30 CA (i.e. crank angle).

Figure 4:
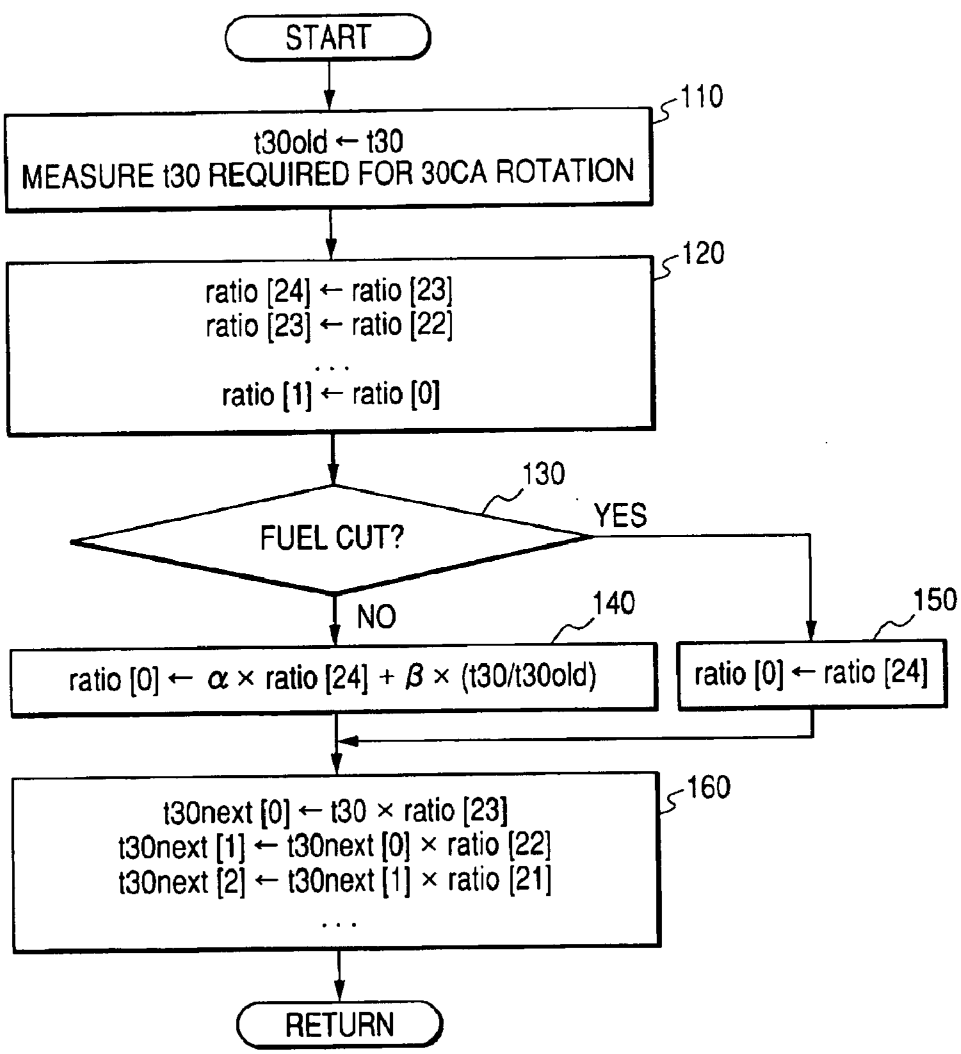
FIG. 4 is a flowchart showing processing procedure for predicting time required for a rotation of the crank shaft in accordance with the first embodiment of the present invention.

First, in step 100, the microcomputer 12 measures a time required for the latest 30 CA (i.e. crank angle) rotation of crank shaft 30 and predicts a time required for an equiangular rotation of the crank shaft 30 starting from the present crank angle based on the measurement result. The microcomputer 12 repeats the above measurement and prediction in response to every equiangular rotation of the crank shaft 30. FIG. 4 is a flowchart showing details of the step 100.

In FIG. 4, first in step 110, the microcomputer 12 regards a previous 't30' as 't30old' where the previous 't30' represents a measured time required for a 30 CA rotation of crank shaft 30 in the previous cycle. The microcomputer 12 measures a new 't30' as a time required for new 30 CA rotation of crank shaft 30.

Next, in step 120, the microcomputer 12 obtains a ratio of times required for consecutive equiangular rotations of the crank shaft 30 that are time sequentially measured. In each cycle, the microcomputer 12 renews 'ratio[i]' as 'ratio[i+1]', where 'ratio[i]' represents a ratio of time measured 'i' cycles before to time measured 'i+1' cycles before. This embodiment holds a total of 25 ratio data, including 'ratio[0]' representing a ratio of time measured in this cycle to time measured one cycle before,—and 'ratio[24]' representing a ratio of time measured 720 CA before to time measured 750 CA before.

Furthermore, in step 130, the microcomputer 12 checks whether a fuel cut control is performed for an internal combustion engine. When no fuel cut control is performed (i.e. NO in step 130), the microcomputer 12 newly calculates the value of 'ratio[0]' representing a ratio of time measured in this cycle to time measured one cycle before (refer to step 140). In this case, the microcomputer 12 removes adverse effects of noises from the measured value 'ratio[0]'. To this end, the microcomputer 12 executes the processing for obtaining a weighted average of the measured times. More specifically, the microcomputer 12 multiplies a predetermined weighting factor $\beta$ with the ratio 't30/t30old' representing a ratio of time measured in this cycle to time measured one cycle before. Meanwhile, the microcomputer 12 multiplies a predetermined weighting factor $\alpha$ with the 'ratio[24]' representing a ratio of time measured 720 CA before to time measured 750 CA before. Then, the microcomputer 12 adds these weighted values to obtain a ratio 'ratio[0]'.

The reason why this embodiment uses the data measured 720 CA before is that the rotational speed of crank shaft 30 involves fluctuations resulting from manufacturing errors of the detection teeth T and combustion efficiency differences of respective cylinders. It is desirable that the weighting factor $\alpha$ is larger than the weighting factor $\beta$.

On the other hand, when the fuel cut control is now performed (i.e. YES in step 130), the microcomputer 12 executes the processing of step 150. In step 150, the microcomputer 12 regards the value of 'ratio[0]' as being identical with 'ratio[24]' without newly calculating the value of 'ratio[0]' representing a ratio of time measured in this cycle to time measured one cycle before. In other words, during the fuel cut control of the engine, the microcomputer 12 continuously fixes the value of 'ratio[0]' to the value of 'ratio[24]' which represents a ratio of time measured 720 CA before to time measured 750 CA before.

The above control is effective to assure the accuracy in calculating the ignition timing immediately after the fuel injection operation resumes. When no fuel is supplied to an engine, the engine causes no rotational changes resulting from unstable combustion conditions. The measurement result obtained from the crank angle sensor 22 during the fuel cut control is different in characteristics from that obtained when no fuel cut control is executed. If the above-described 'ratio[i]' is calculated during the fuel cut control, it will be difficult to accurately calculate the requisite time when the fuel injection operation resumes.

On the contrary, according to the above-described processing, the microcomputer 12 retains the value of 'ratio [i]' measured before the fuel cut control is executed. Thus, the microcomputer 12 can accurately calculate the requisite time when the fuel injection operation resumes considering the rotational changes resulting from unstable combustion conditions.

After finishing the processing of step 140 or step 150, the microcomputer 12 executed the processing of step 160. In step 160, the microcomputer 12 calculates 't30next[i]' representing the predicted time required for a 30 CA rotation of crank shaft 30 starting from a crank angle '30×i', wherein '30×i' is defined with respect to the present crank angle serving as a zero point. For example, 't30' represents time measured at the present crank angle, and 'ratio[23]' represents a ratio of time measured 720 CA before to time measured 690 CA before. The predicted time required for a 30 CA rotation of crank shaft 30 starting from the present crank angle is obtained as a multiplication of these values, i.e. 't30next[0]'='t30'×'ratio[23]'. In general, 't30next[i]' representing predicted time required for a 30 CA rotation of crank shaft 30 starting from a crank angle '30×i' can be expressed by the following equation.

$$`t30next[i]' = `t30next[i-1]' \times `ratio[23-i]'$$

In the processing of step 160, the microcomputer 12 calculates 't30next[i]' primarily based on 'ratio[23]' representing a ratio of time measured 720 CA before to time measured 690 CA before. Using the value 'ratio[23]' as a basic reference value is effective in eliminating adverse effects of unstable rotation of crank shaft 30 which usually results from manufacturing errors of the above-described detection teeth T and combustion efficiency difference of respective cylinders.

After finishing the processing of step 160, the microcomputer 12 executes the processing of step 200 shown in FIG. 3. In step 200, the microcomputer 12 discriminates a cylinder as an object of the ignition timing control. More specifically, the microcomputer 12 judges whether the present crank angle is positioned in the compression stroke or the combustion and expansion stroke in respective, i.e. first to fourth, cylinders. To this end, a crank angle region 'BTDC 270-ATDC90' including the ignition timing is assigned to each cylinder. The microcomputer 12 identifies a cylinder in which the present crank angle is present in the above-described crank angle region.

After any cylinder is identified in step 200, the microcomputer 12 executes the succeeding processing of steps 210 to 500 for the identified cylinder. The crank angles used in these steps should be defined for respective cylinders.

Figure 5:
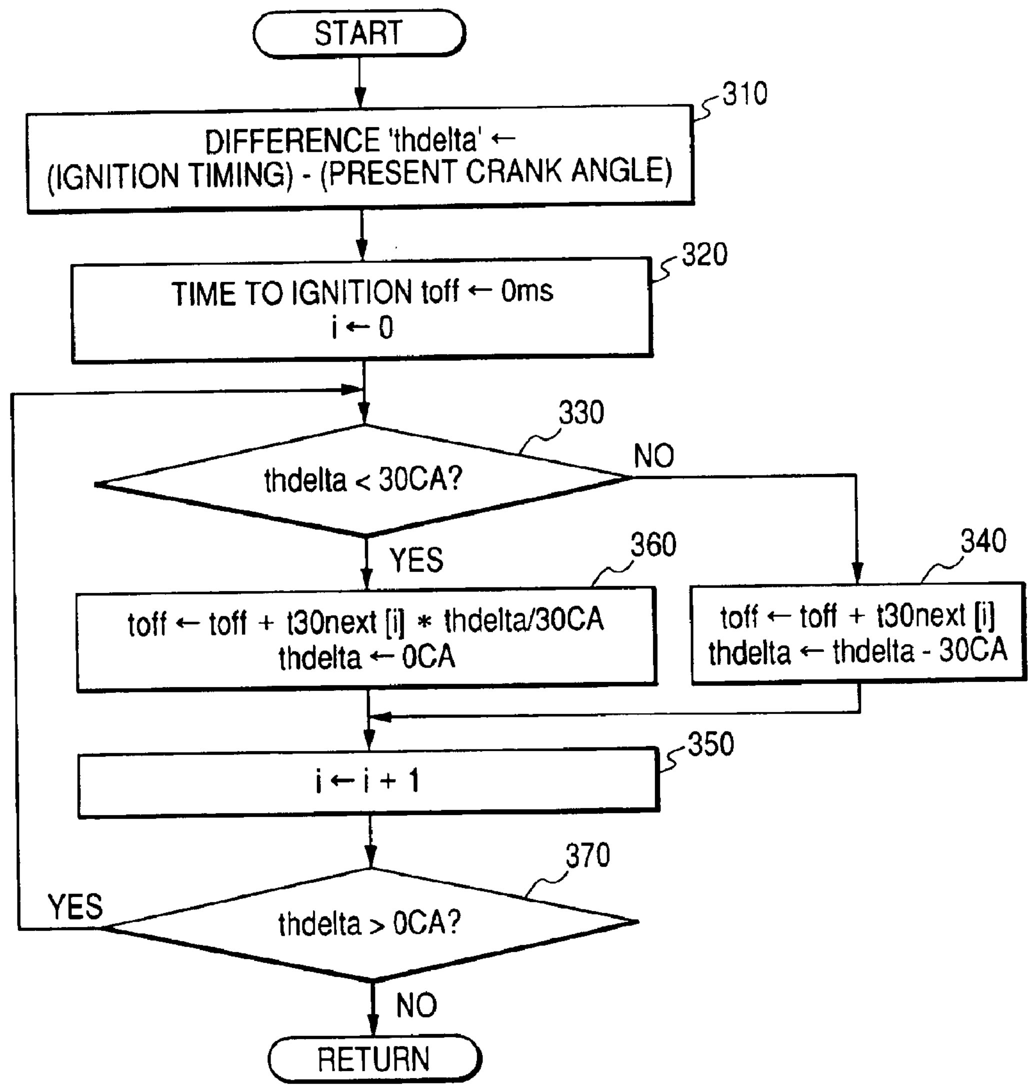
FIG. 5 is a flowchart showing procedure for calculating a requisite time required for the ignition timing control in accordance with the first embodiment of the present invention.

After finishing the processing of step 200, the microcomputer 12 checks in step 210 if power supply is already started in the corresponding cylinder. Then, when the power supply is already started (i.e. YES in step 210), the microcomputer 12 terminates this routine. On the other hand, when the power supply is not started yet (i.e. NO in step 210), the microcomputer 12 executes the processing of step 300. In step 300, the microcomputer 12 calculates a requisite time required for the crank shaft 30 to rotate from the present crank angle to a crank angle indicating the ignition timing. FIG. 5 shows details of the processing performed in step 300.

In the routine show in FIG. 5, first in step 310, the microcomputer 12 calculates a difference 'thdelta' representing a difference between the present crank angle and the crank angle indicating the ignition timing. The ignition timing should be set to an appropriate time considering driving conditions of an engine.

Next, in step 320, the microcomputer 12 initializes a variable 'toff' which is used to calculate the time required for the crank shaft 30 to rotate from the present crank angle to the crank angle indicating the ignition timing. Furthermore, the microcomputer 12 initializes another variable 'i' in this step.

Next, the microcomputer 12 executes sequential calculations in the processing of succeeding steps 330 to 370 to predict the time required for the crank shaft 30 to rotate from the present crank angle to the crank angle indicating the ignition timing. More specifically, the microcomputer 12 calculates a time required for each 30 CA rotation of crank shaft 30 based on the time obtained in the processing of step 160 shown in FIG. 4, in response to each 30 CA increment from the present crank angle.

More specifically, in step 330, the microcomputer 12 checks whether the difference 'thdelta' representing the difference between the present crank angle and the crank angle indicating the ignition timing is less than 30 CA. When the difference 'thdelta' is less than 30 CA (i.e. YES in step 330), the microcomputer 12 cannot calculate time required for a 30 CA rotation of crank shaft 30 by directly using the time obtained in the processing of step 160 shown in FIG. 4. Thus, the microcomputer 12 performs the processing of step 360.

On the other hand, when the difference 'thdelta' is equal to or larger than 30 CA (i.e. NO in step 330), the microcomputer 12 executes the processing of step 340. In step 340, the microcomputer 12 calculates a time required for a 30 CA rotation of crank shaft 30 from a predetermined crank angle based on the time obtained in the processing of step 160 shown in FIG. 4. More specifically, when the control procedure first proceeds to step 340 after finishing initialization of the above-described variable 'i', the microcomputer 12 renews the above-described variable 'toff' by adding 't30next[0]' to this variable 'toff', wherein 't30next [0]' represents a time required for a 30 CA rotation of crank shaft 30 from the present crank angle. When the microcomputer 12 executes the processing of step 340 next time, the microcomputer 12 renews the variable 'toff' by adding 't30next[1]' to this variable 'toff', wherein 't30next[1]' represents a time required for a 30 CA rotation of crank shaft 30 from a crank angle retarded from the present crank angle by 30 CA. In this manner, the microcomputer 12 subtracts 30 CA from the value of difference 'thdelta' each time the above-described variable 'toff' is renewed. The microcomputer 12 executes the processing of succeeding steps 350 and 370 and then returns to step 330. The microcomputer 12 repeats the processing of step 340 until the remaining difference 'thdelta' becomes smaller than 30 CA through such circulative calculations.

Meanwhile, when the remaining difference 'thdelta' is less than 30 CA (i.e. YES in step 330), the microcomputer 12 executes the processing of step 360. In step 360, the microcomputer 12 calculates the value of variable 'toff' for the remaining crank angle region having been not processed in the above steps S340. More specifically, the microcomputer 12 obtains a time corresponding to the remaining crank angle region based on the time 't30next[i]' calculated in step 160 of FIG. 4, by introducing a linear interpolation based on a time required for a 30 CA rotation of crank shaft 30 including this remaining crank angle region. The microcomputer 12 renews the variable 'toff' by adding this 'toff' to the interpolated data (i.e. t30next[i]×thdelta/30 CA).

In calculating the requisite time required for the crank shaft 30 to rotate from the present crank angle to the crank angle indicating the ignition timing in step 340 or in step 360, the microcomputer 12 uses the predicted time 't30next [i]' shown in FIG. 4. The predicted time 't30next[i]' includes the data corresponding to the crank angle indicating the ignition timing. Accordingly, in calculating the requisite time, the microcomputer 12 uses the above-described second time information obtained from the measurement result with respect to the time required for each 30 CA rotation of crank shaft 30. The second time information represents a time required for the crank shaft 30 to rotate a second angle that begins from the preceding crank angle and corresponds to a rotation from the present crank angle to the crank angle indicating ignition timing. The preceding crank angle leads the present crank angle by the above-described predetermined amount (e.g. 720 CA according to this embodiment).

Meanwhile, the microcomputer 12 regards the value of 'thdelta' as 0 CA in the step 360. After finishing the processing of step 360, the microcomputer 12 executes the processing of step S350 in which the variable 'i' is incremented by 1. Then, the microcomputer 12 executes the processing of step 370 in which the microcomputer 12 checks whether or not the remaining difference 'thdelta' is larger than 0 CA. When the remaining difference 'thdelta' is larger than 0 CA (i.e. YES in step 370), the microcomputer 12 returns to the processing of step 330. When the remaining difference 'thdelta' is not larger than 0 CA (i.e. NO in step 370), the microcomputer 12 terminates this routine and proceeds to the processing of step 400 in FIG. 3.

Figure 6:
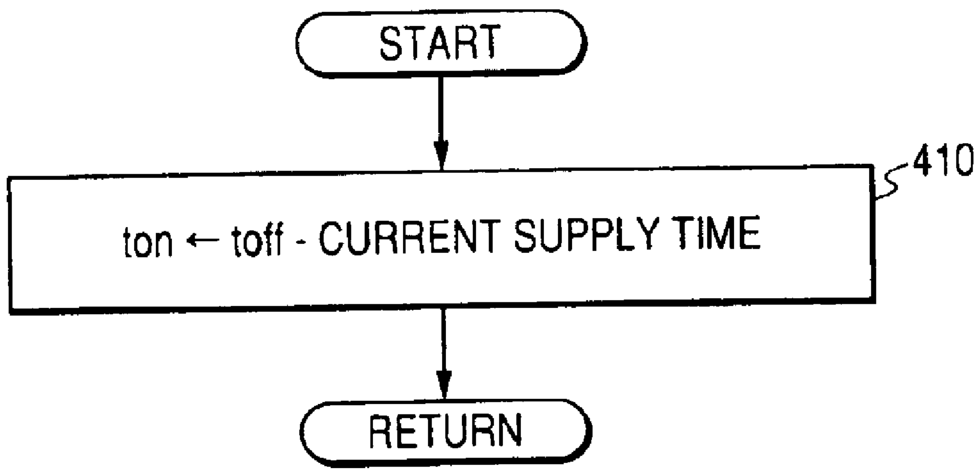
FIG. 6 is a flowchart showing procedure for calculating power supply start timing in accordance with the first embodiment of the present invention.

In step 400, the microcomputer 12 calculates power supply start timing 'ton' based on the ignition timing calculated in the step 300. FIG. 6 shows the processing of step 400. As shown in FIG. 6, in step 410, the microcomputer 12 calculates the power supply start timing 'ton' by subtracting a power supply time from the above-described variable 'toff', wherein 'toff' represents a time required for the crank shaft 30 to rotate from the present crank angle to the crank angle indicating the ignition timing as explained with reference to the flowchart of FIG. 5.

After finishing the processing of step 400, the microcomputer 12 executes the processing of step 500 shown in FIG. 3. In step 500, the microcomputer 12 sets timers for the power supply start timing 'ton' calculated in the step 400, and the ignition timing calculated in the step 300.

Figure 7:
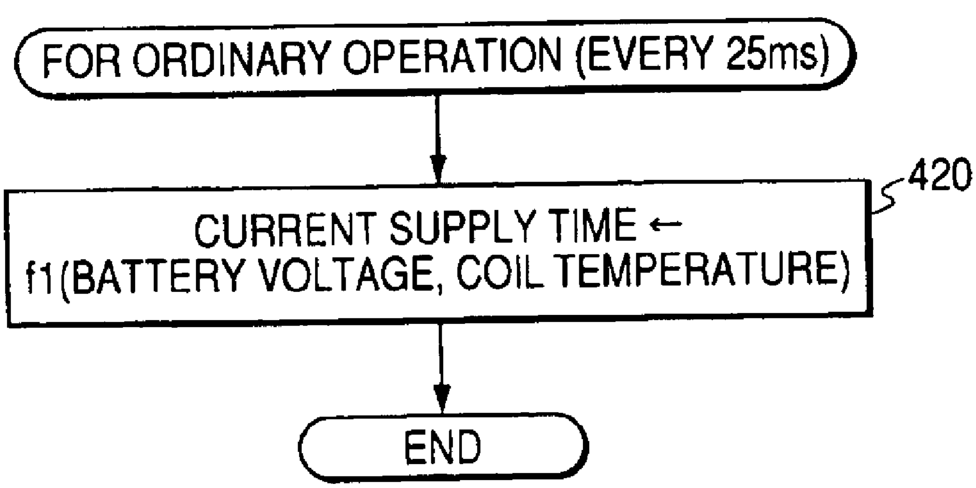
FIG. 7 is a flowchart showing procedure for calculating power supply time for the ignition coil in accordance with the first embodiment of the present invention.

FIG. 7 shows the processing for calculating the power supply time used in the processing shown in FIG. 6, which is repetitively executed at predetermined intervals (e.g. 25 msec) by the microcomputer 12. In step 420, the microcomputer 12 calculates the power supply time based on detection values of the battery voltage sensor 20 and the ignition coil temperature sensor 21 shown in FIG. 1 with reference to a given map f1. The map data are obtained beforehand to optimize the output voltage of the ignition coil FC for the ignition control of a corresponding ignition plug FP.

Figure 8:
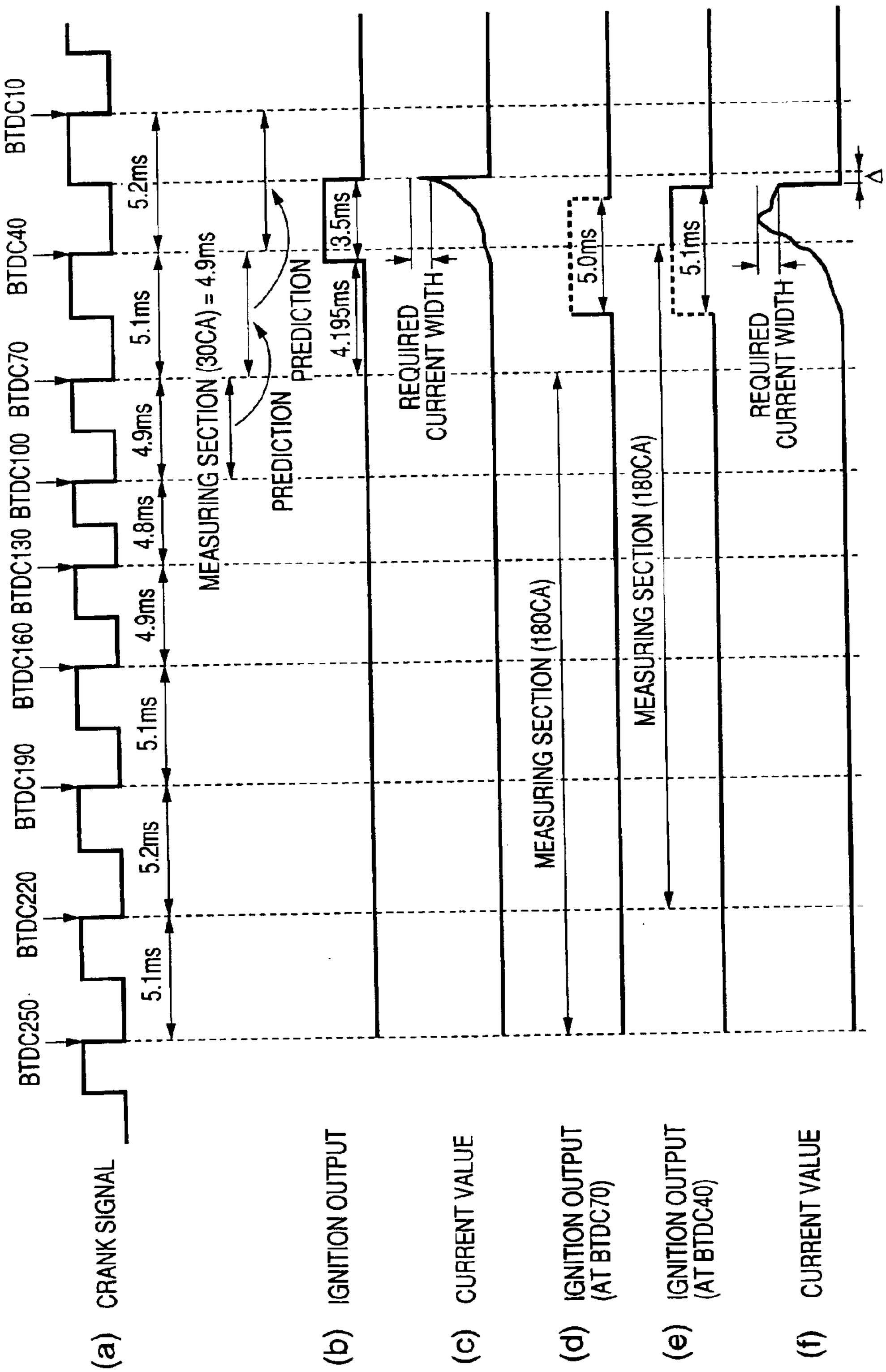
FIG. 8 is a timing chart showing ignition timing control in accordance with the first embodiment of the present invention.

FIG. 8 is a timing chart showing the ignition timing control performed by the microcomputer 12 in accordance with this embodiment of the present invention. In FIG. 8, (a) represents a crank signal, (b) represents calculation result of an ignition output, and (c) represents a current value supplied to the ignition coil. In FIG. 8, it is assumed that the crank shaft 30 periodically causes rotational changes. The power supply time is 3.5 ms, and the ignition timing is set to BTDC 25.

When the present crank angle is BTDC70, the microcomputer 12 sets the ignition timing and the power supply start timing as explained with reference to FIG. 3. In this case, 't30' is 4.9 msec. As explained in FIG. 4, 't30' represents a time required for a rotation of crank shaft 30 from BTDC100 to BTDC70 that corresponds to a 30 CA rotation measured in the present cycle. Furthermore, the values of 'ratio[23]' and 'ratio[22]' are different from each other due to rotational changes occurring periodically, and are obtained as 1.04 (=5.1÷4.9) and 1.02 (=5.2÷5.1) respectively.

Accordingly, the ignition timing can be obtained in the following manner.

$$4.9\times1.04+(15/30)\times4.9\times1.04\times1.02\approx7.695 \text{ msec}$$

Furthermore, the power supply start timing can be obtained in the following manner.

$$7.695-3.5=4.195 \text{ msec}$$

The predicted time required for a rotation of crank shaft 30, which is used for calculating the power supply start timing and the ignition timing, is substantially equal to actual time. Therefore, no margin is required for the power supply time. The microcomputer 12 can set an appropriate power supply amount so that the output voltage of the ignition coil FC can be optimized for the ignition control of a corresponding ignition plug FP. Therefore, without relying on a regulator, the microcomputer 12 can adjust the current flowing in the ignition coil FC so as to have a width within a required current pulse width. It becomes possible to suppress heat generating in the electronic control apparatus 10.

Especially, according to this embodiment, the microcomputer 12 does not perform these calculations again at the crank angle BTDC40 after the power supply operation once starts when the microcomputer 12 executes the processing of step 210 in FIG. 3. Accordingly, the power supply time being set as an appropriate value is not renewed. The microcomputer 12 can accurately control the current flowing in ignition coil FC to a desired value based on the power supply time having been set beforehand so as to provide an appropriate power supply amount.

Furthermore, the microcomputer 12 can accurately calculate the ignition timing by predicting a time required for a 30 CA rotation of crank shaft 30 as described above, even when the microcomputer 12 gives priority to the power supply time so this calculation can be accurately performed.

In FIG. 8, (d) and (e) represent calculation results of ignition outputs at the crank angles BTDC70 and BTDC40 respectively, according to a conventional ignition timing control, and (f) represents a current value supplied to an ignition coil according to this conventional ignition timing control.

In this case, it is assumed that an appropriate power supply time is 3.5 msec. However, according to this conventional ignition timing control, an actual power supply time is set to 5.0 msec considering a margin necessary for rotational changes. The ignition outputs at the crank angles BTDC70 and BTDC40 are calculated based on the measurement result of a time required for a preceding 180 CA rotation, respectively. According to such measurement results, an average time required for a 30 CA rotation is 5.0 msec.

Accordingly, the ignition timing at the crank angle BTDC70 can be obtained in the following manner.

$$5.0+(15/30)\times5.0=7.5\text{msec}$$

Furthermore, the power supply start timing at the crank angle BTDC70 can be obtained in the following manner.

$$7.5-5.0=2.5\text{ msec}$$

On the other hand, the ignition timing at the crank angle BTDC40 can be obtained in the following manner.

$$(15/30)\times5.0=2.5\text{ msec}$$

As the crank angle 'BTDC70-BTDC10' is the compression stroke of a piston, the rotational speed of crank shaft 30 is slightly low. This is the reason why the time required for a rotation of crank shaft 30 covering the crank angle 'BTDC70-BTDC40' is 5.1 msec and the time required for a rotation of crank shaft 30 covering the crank angle 'BTDC40-BTDC10' is 5.2 msec. These times are longer than the average time 5.0 msec. Hence, the power supply time is elongated by 0.1 (=5.1−5.0) msec when recalculation of the ignition timing is performed with respect to crank angle BTDC40 being designated as standard. Furthermore, due to reduction of the rotational speed of crank shaft 30 in the crank angle 'BTDC40-BTDC10', the ignition timing is advanced by an amount of 0.1 (=(5.2−5.0)/2) msec.

According to the above-described conventional ignition timing control, it is difficult to set the power supply time to an appropriate value. A regulator is necessary to adjust the power supplied to the ignition coil within a required current pulse width. A deviation Δ (=0.1 msec) is caused between the ignition timing and a designated ignition timing.

On the contrary, this embodiment brings the following effects.

(I) Using the above-described three, i.e. first to third, time information enables the microcomputer 12 to accurately calculate the requisite time required for the crank shaft 30 to rotate from the present crank angle to the crank angle indicating the ignition timing.

(II) This embodiment calculates a ratio of times required for equiangular rotations of the crank shaft 30 which are time sequentially measured. Meanwhile, the embodiment measures a time required for an equiangular rotation of the crank shaft 30 which ends at the present crank angle. Thus, the microcomputer 12 can simply calculate the requisite time based on the above data.

(III) In calculating 't30next[i]', this embodiment uses a ratio of times measured 720 CA before. This is effective in eliminating adverse effects of unstable rotational speeds of crank shaft 30 which generally result from manufacturing errors of the detection teeth T and combustion efficiency differences of respective cylinders.

(IV) In calculating 'ratio[i]', this embodiment introduces a weighted average processing. This is effective in removing adverse effects of noises.

(V) To execute the weighted average processing, this embodiment multiplies a predetermined weighting factor β with 't30/t30old' representing a ratio of time measured in the present cycle to time measured in the previous cycle. Furthermore, this embodiment multiplies a predetermined weighting factor α with 'ratio[24]' representing a ratio of time measured 720 CA before to time measured 750 CA before. This embodiment adds these weighted values. Using the time data measured 720 CA before is effective in eliminating adverse effects of unstable rotational speeds of crank shaft 30 which generally result from manufacturing errors of the detection teeth T and combustion efficiency differences of respective cylinders.

(VI) During the fuel cut control, this embodiment regards the value of 'ratio[0]'as being identical with the value of 'ratio[24]', wherein 'ratio[0]' represents a ratio of time measured in the present cycle (i.e. 0 CA before) to time measured in the previous cycle (i.e. 30 CA before) while 'ratio[24]' represents a ratio of time measured 720 CA before to time measured 750 CA before. This enables the microcomputer 12 to accurately calculate the ignition timing when the fuel injection operation resumes.

Second Embodiment

Hereinafter, a second embodiment of the present invention will be explained based on an ignition timing control apparatus which serves as a control apparatus for an internal combustion engine of the present invention. Differences between the above-described first embodiment and the second embodiment will be chiefly explained with reference to the attached drawing.

According to the second embodiment, the microcomputer 12 stores predetermined data used for defining a relationship between a time required for each equiangular rotation of the crank shaft 30 during an engine startup condition and an estimated time required for a succeeding equiangular rotation of the crank shaft 30. The crank angle sensor 22 measures the time required for each equiangular rotation of the crank shaft 30 during the engine startup condition.

When the engine is in the startup condition, the microcomputer 12 calculates the requisite time based on a time required for equiangular rotation of the crank shaft 30 ending at the present crank angle as well as the above-described stored data. In general, the rotational speed of the crank shaft 30 greatly changes when the engine is in the startup condition. It is therefore difficult to accurately predict the time required for the next equiangular rotation of the crank shaft 30 starting from the present crank angle based on the measurement result obtained by the crank angle sensor 22.

FIG. 9 shows the data stored in the microcomputer 12, in which the data represents a ratio of measured time required for an equiangular rotation (i.e. 30 CA rotation) of crank shaft 30 in each crank angle region to estimated time required for the next equiangular rotation of crank shaft 30. FIG. 9 shows '100 msec', '80 msec', '60 msec', '40 msec', '20 msec', and '10 msec' as measured time data for equiangular rotation (i.e. 30 CA rotation). FIG. 9 shows correction data for each of crank angle regions 'BTDC100-BTDC70', 'BTDC70-BTDC40', 'BTDC40-BTDC10', 'BTDC10-ATDC20', 'ATDC20-ATDC50', and 'ATDC50-ATDC80'. For example, according to the map data shown in FIG. 9, in a case that the crank angle region is 'BTDC10-ATDC20' and the measured time is 20 msec, the ratio of time required for a rotation of 'BTDC10-ATDC20' to time required for a rotation of 'BTDC20-ATDC50' is 0.96. FIG. 9 provides correction data covering 180 degrees in the crank angle, considering rotational changes of crank shaft 30 occurring due to characteristics of combustion cycle in a 4-cylinder internal combustion engine.

Figure 10:
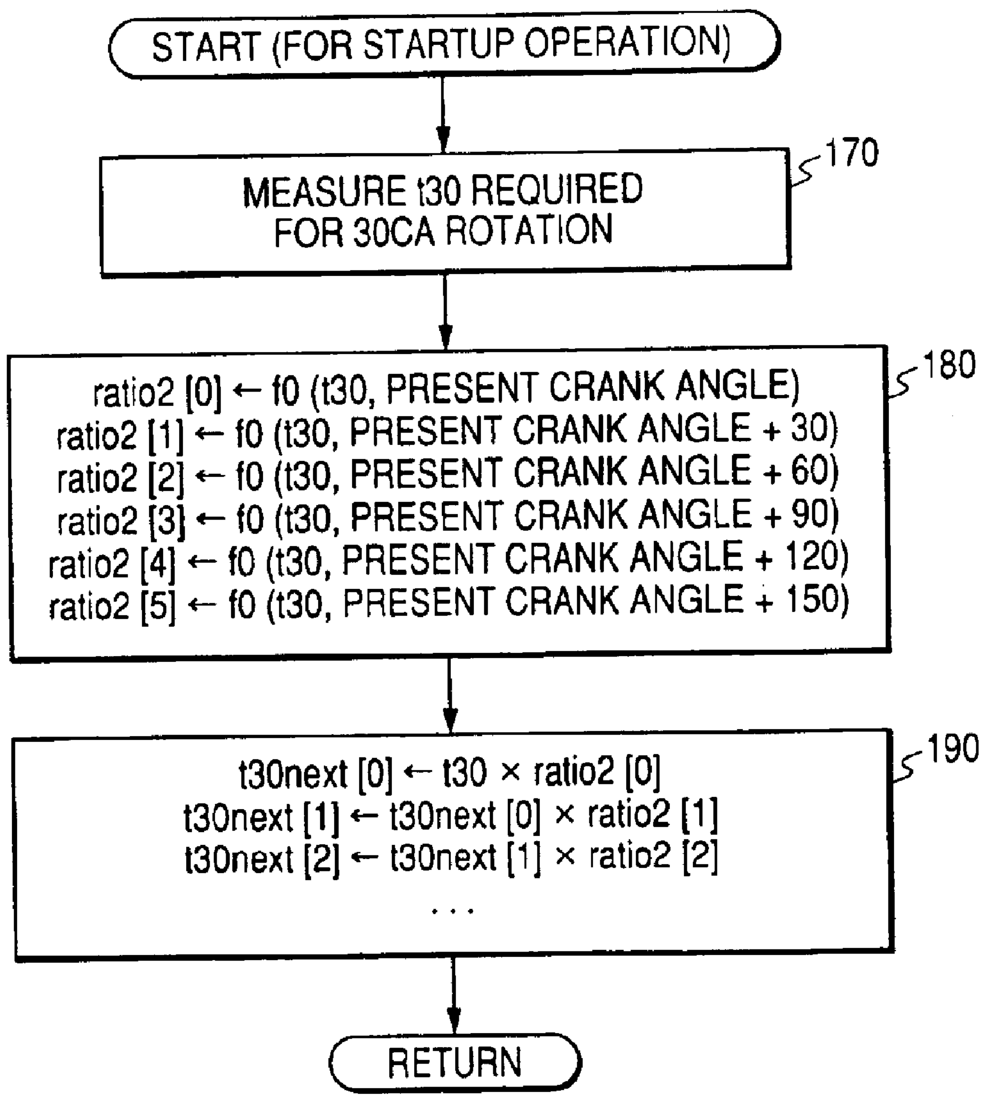
FIG. 10 is a flowchart showing procedure for predicting the time required for a rotation of the crank shaft in accordance with the second embodiment of the present invention.

FIG. 10 is a flowchart showing the processing procedure performed by the microcomputer 12, as the above-described step 100 of FIG. 3, during an engine startup condition. In this description, the engine startup condition corresponds to an initial rotational condition of crank shaft 30 of an internal combustion engine which continues rotating with the aid of a starter until it reaches self-sustainable rotation without using the starter.

The microcomputer 12 monitors the rotational speed of crank shaft 30 after the starter is activated. The microcomputer 12 detects the engine startup condition by checking whether or not the rotational speed of crank shaft 30 exceeds a predetermined rotational speed (e.g., 500 rpm).

As shown in FIG. 10, in step 170, the microcomputer 12 measures 't30' which represents time required for a 30 CA rotation ending at the present crank angle. In the next step 180, the microcomputer 12 calculates 'ratio2[i] (i=0~5)' based on the data shown in FIG. 9, wherein 'ratio2[i] (i=0~5)' represents a ratio of times required for consecutive equiangular rotations of crank shaft 30 which are time sequentially measured. More specifically, 'ratio2[i]' is a ratio of time required for an angular rotation of '(i−1)×30~i×30' with respect to the present crank angle to time required for an angular rotation of 'i×30~(i+1)×30'.

For example, the microcomputer 12 can calculate 'ratio2[0]' based on the data shown in FIG. 9 by designating the measured time as 't30' and the crank angle region as a 30 CA region ending at the present crank angle, wherein 'ratio2[0]' represents a ratio of times required for consecutive 30 CA rotations of crank shaft 30 positioned before and after the present crank angle. The microcomputer 12 can calculate 'ratio2[1]' based on the data shown in FIG. 9 by designating the measured time as 't30' and the crank angle region as a 30 CA region starting from the present crank angle, wherein 'ratio2[1]' represents a ratio of times required for consecutive 30 CA rotations of crank shaft 30 positioned before and after a crank angle retarded by 30 CA from the present crank angle.

In this case, there is the possibility that the measured time 't30' does not completely agree with practical time data shown in FIG. 9. In such a case, the microcomputer 12 calculates an approximate value of 'ratio2[i]' by using the linear interpolation. According to this embodiment, calculation of 'ratio2[i]' including the above-described interpolation is expressed as a function f0 in FIG. 10. Furthermore, the microcomputer 12 executes the processing for matching the crank angle serving as an independent variable with the crank angle region shown in FIG. 9. For example, when the present crank angle is BTDC70, the microcomputer 12 calculates the function f0 based on the data of crank angle region 'BTDC70-BTDC40' to obtain the ratio 'ratio2[0]'. The microcomputer 12 inputs 'BTDC70+150' as the independent variable of the function f0 when obtaining the ratio 'ratio2[5]', and accesses the data corresponding to the crank angle region 'BTDC100-BTDC70'.

In the processing of step 180, the microcomputer 12 calculates 'ratio2[i]' based on the measured time 't30'. Accordingly, when 'i' is large, the calculated value is not reliable. However, the rotational speed of crank shaft 30 is small when the engine is in the startup condition. The power supply time will be shorter than 30 CA. This is the reason why the above simplified processing is appropriate.

After finishing the processing of step 180, the microcomputer 12 executes the processing of step 190. In step 190, the microcomputer 12 calculates the estimated time 't30next[i]' representing time required for an angular rotation of '30×i~30×(i+1)' with respect to the present crank angle. For example, the microcomputer 12 calculates the estimated time 't30next[0]' by multiplying 't30' with 'ratio2[0]', wherein t30next[0] represents a measured time required for a 30 CA rotation starting from the present crank angle, 't30' represents a time value measured in step 170, and 'ratio2[0]' represents a ratio of times obtained in step 180.

After finishing the processing of step 190, the microcomputer 12 proceeds to the above-described step 200 of FIG. 3. As apparent from the foregoing, this embodiment uses the data shown in FIG. 9 which is prepared beforehand and stored in the microcomputer 12. Thus, microcomputer 12 can appropriately calculate the estimated time 't30next[i]' required for the above-described 30 CA rotation. Accordingly, the microcomputer 12 can accurately calculate the above-described requisite time.

Figure 11:
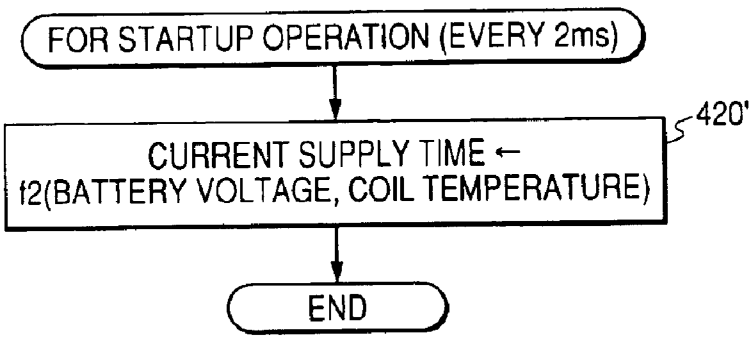
FIG. 11 is a flowchart showing procedure for calculating power supply time for the ignition coil in accordance with the second embodiment of the present invention.

When the engine is in the startup condition, the microcomputer 12 changes the interval of calculations for the processing of step 400. As shown in FIG. 11 (step 420'), the microcomputer 12 calculates the power supply time at the intervals of 2 msec that is shorter than the ordinary interval (25 msec) shown in FIG. 7. Namely, the power supply time calculation interval during the startup condition of the engine is set to be shorter than the power supply time calculation interval used for the engine operating in the ordinary condition, because the battery voltage fluctuates largely.

The above-described second embodiment brings the following effects in addition to the above (I) to (VI) effects explained in the first embodiment.

(VII) The second embodiment uses the data shown in FIG. 9 which is prepared and stored in the microcomputer 12. The data shown in FIG. 9 enable the microcomputer 12 to properly calculate the estimated time 't30next[i]' required for the above-described 30 CA rotation during the engine startup condition. Accurately, the microcomputer 12 can accurately calculate the above-described requisite time.

(VIII) The second embodiment sets the power supply time calculation interval during the engine startup condition to be shorter than the power supply time calculation interval used for the engine operating in the ordinary condition. Thus, the microcomputer 12 can obtain an adequate power supply time even when the battery voltage fluctuates largely.

Third Embodiment

Hereinafter, a third embodiment of the present invention will be explained based on an ignition timing control apparatus which serves as a control apparatus for an internal combustion engine of the present invention. Differences between the above-described second embodiment and the third embodiment will be chiefly explained with reference to the attached drawing.

According to the third embodiment, the microcomputer 12 removes adverse effects brought by temperature changes of cooling water of an internal combustion engine and variations in the battery voltage in the process of calculating 'ratio2[i] (i=0~5)' representing the ratio of times required for consecutive equiangular rotations of crank shaft 30 which are time sequentially measured, as well as using the data shown in FIG. 9. The following is the reasons why the third embodiment executes such corrections.

The first reason is that, in the engine startup condition (especially when an ambient temperature is low), the crank shaft rotates with great friction. The rotational changes of the crank shaft greatly depend on the warm-up condition of the engine.

The second reason is that, in the engine startup condition, rotational conditions of the crank shaft greatly depend on the voltage of a battery supplying electric power to a starter.

Therefore, the third embodiment executes corrections based on the temperature of cooling water and the battery voltage which are proper indices of engine warm-up condition. Thus, the third embodiment can improve the appropriateness of the above-described time ratio 'ratio2[i] (i=0~5)'.

Figure 12:
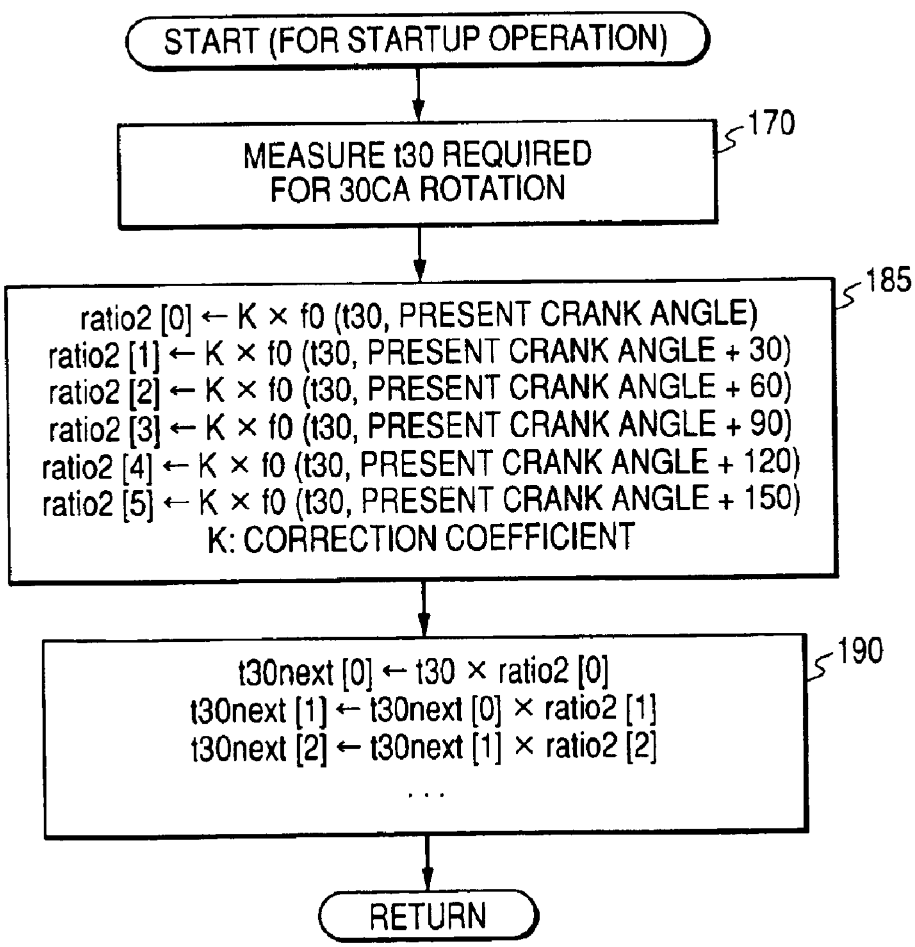
FIG. 12 is a flowchart showing procedure for predicting the time required for a rotation of the crank shaft in an ignition timing control apparatus for an internal combustion engine in accordance with a third embodiment of the present invention.

To this end, the third embodiment replaces the processing procedure shown in FIG. 10 with the processing procedure shown in FIG. 12 in which the microcomputer 12 executes the processing of step 185. The microcomputer 12 multiplies a correction coefficient K with the function f0 calculated based on the data shown in FIG. 9 (including interpolated data). The correction coefficient K is determined beforehand with reference to the temperature of cooling water and the battery voltage. The microcomputer 12 calculates the above-described time ratio 'ratio2[i] (i=0~5)' based on the corrected value obtained in step 185.

The above-described third embodiment brings the following effects in addition to the above (I) to (VI) effects explained in the first embodiment and the effects (VII and (VIII) explained in the second embodiment.

(IX) The microcomputer 12 can obtain an appropriate 'ratio2[i] (i=0~5)' with reference to the temperature of cooling water and the battery voltage which are proper indices of engine warm-up condition.

Other Embodiment

The above-described embodiments can be modified in the following manner.

The calculation of 't30next[i]' is not limited to the use of time ratio data measured M×720 CA before (M is an integer). For example, it is possible to use time ratio data measured M×360 CA before (M is an integer). In any case, it is possible to eliminate adverse effects resulting from manufacturing errors of the detection teeth T and characteristic differences of the crank shaft rotational speed sensing device.

Furthermore, N represents a total number of the cylinders of an internal combustion engine, it is possible to calculate 't30next[i]' based on time ratio data measured 'M×720/N' CA before (M is an integer). This is effective in eliminating adverse effects of rotational changes resulting from characteristics of combustion cycle. In this case, '720/N' is usually equal to an angular offset between top dead centers of respective engine cylinders.

The weighted average processing used in the calculation of measured time ratio 'ratio[i]' is not limited to the use of 'ratio[24]' measured 2×M cycles before (M is an integer). For example, it is possible to use time ratio data measured M×360 CA before (M is an integer). This is effective in eliminating adverse effects resulting from manufacturing errors of the detection teeth T and characteristic differences of the crank shaft rotational speed sensing device.

Furthermore, N represents a total number of the cylinders of an internal combustion engine, it is possible to use time ratio data measured 'M×720/N' CA before (M is an integer). This is effective in eliminating adverse effects of rotational changes resulting from characteristics of combustion cycle. In this case, '720/N' is usually equal to an angular offset between top dead centers of respective engine cylinders.

Once the power supply control starts, it is possible to accurately control the ignition timing even if re-calculating the requisite time is not inhibited.

According to the second and third embodiments, the microcomputer 12 calculates the time ratio 'ratio2[i]' based on the measured time 't30'. However, it is possible for the microcomputer 12 to calculate 't30next[0]' after finishing the calculation of 'ratio2[0]' according to the second or third embodiment, and then calculate 'ratio2[1]' based on the above-described function f0 (t30next[0], present angle+30). According to such a modification, reliability of estimated time 't30next[i] (i=1~5)' can be increased by calculating 'ratio2[i] (i=1~5)' based on the function f0 (t30next[i−1], present angle×i). Furthermore, in a case that the power supply time is less than 30 CA, it is desirable to simplify the above processing by calculating 'ratio2[0]' only.

In the third embodiment, it is possible to further consider the charged amount of a battery in determining the above-described correction coefficient K. The battery voltage reduction in response to activation of a starter is dependent on the state of charge. Thus, in the startup condition of an internal combustion engine, the rotational conditions of the crank shaft greatly depend on the electric power charged in the battery. Furthermore, the correction coefficient K can be determined in accordance with at least one of the cooling water temperature, the battery voltage, and the battery charged amount. Moreover, when the microcomputer 12 corrects the requisite time in response to at least one of the cooling water temperature, the battery voltage, and the battery charged amount in the engine startup condition, it is possible to directly correct the requisite time calculated in FIG. 5 without using the above-described correction coefficient K.

The accuracy in calculating the requisite time based on the data shown in FIG. 9 is dependent on a motor capacity of the starter and a compression ratio of an internal combustion engine. Therefore, it is preferable to provide a correcting means for correcting the requisite time which is once calculated based on the prepared fundamental data. In this case, the correcting means corrects the requisite time in accordance with the characteristics of a starter of an automotive vehicle which installs this control apparatus as well as the compression ratio of an internal combustion engine. For example, it is possible to determine the correction coefficient K so as to suit for an employed starter or for each internal combustion engine. This is effective in improving the applicability of such fundamental data.

The sensing means for detecting the crank angle of an engine is not limited to the multi-pulse type sensor that generates numerous crank signals in response to each increment of a predetermined crank angle. For example, it is possible to use a cylinder pulse type sensor that causes only one of two crank signals per cylinder.

The measuring means for measuring a time required for a predetermined rotation of the crank shaft based on crank signals representing the crank angle is not limited to the one disclosed in the above-described respective embodiments. For example, instead of performing the measurement in response to each equiangular rotation of the crank shaft, it is possible to perform the measurement in a limited crank angle region only.

The calculating means for calculating the requisite time based on three time information obtainable from measurement result of the measuring means is not limited to the one disclosed in the above-described respective embodiments or their modifications. For example, instead of successively calculating 't30next[i]', it is possible to calculate, at the same time, a group of estimated times required for different (e.g. 60 CA and 90 CA) rotations of the crank shaft starting from the present crank angle. For example, to calculate the time required for a 90 CA rotation of crank shaft 30 starting from the present crank angle, the microcomputer 12 can multiply the measured time 't30' with the time required for a 90 CA rotation of crank shaft 30 two cycles before. Then, the microcomputer 12 can divide the multiplied value by the time required for a 30 CA rotation two cycles before.

Using the above calculating method is effective in reducing the number of multiplying operations and accordingly the burden of a microcomputer can be reduced. Furthermore, the present invention is not limited to this kind of bunch calculation simultaneously calculating the times required for the '30×n' rotation. In short, the microcomputer 12 obtains the first time information representing a time required for the crank shaft 30 to rotate a first angle ending at a preceding crank angle that is advanced a predetermined amount from the present crank angle. The microcomputer 12 obtains the second time information represents a time required for the crank shaft 30 to rotate a second angle starting from the preceding crank angle and corresponding to a rotation from the present crank angle to a designated crank angle. And, the microcomputer 12 obtains the third time information represents a time required for the crank shaft 30 to rotate the third angle ending at the present crank angle. The third angle is equal in size with the first angle. Alternatively, the microcomputer 12 estimates a mutual relationship between times required for consecutive angular regions positioned before and after the present crank angle based on measurement result of the mutual relationship between times required for consecutive angular regions positioned before and after a preceding crank angle advanced a predetermined amount from the present crank angle.

The arrangement of the ignition device is not limited to the one shown in FIG. 1. For example, instead of using DLI (i.e. distributor-less ignition), it is desirable to use an ignition device equipped with a distributor. Furthermore, it is not necessary to provide the ignition module 11 in the electronic control apparatus.

Figure 13:
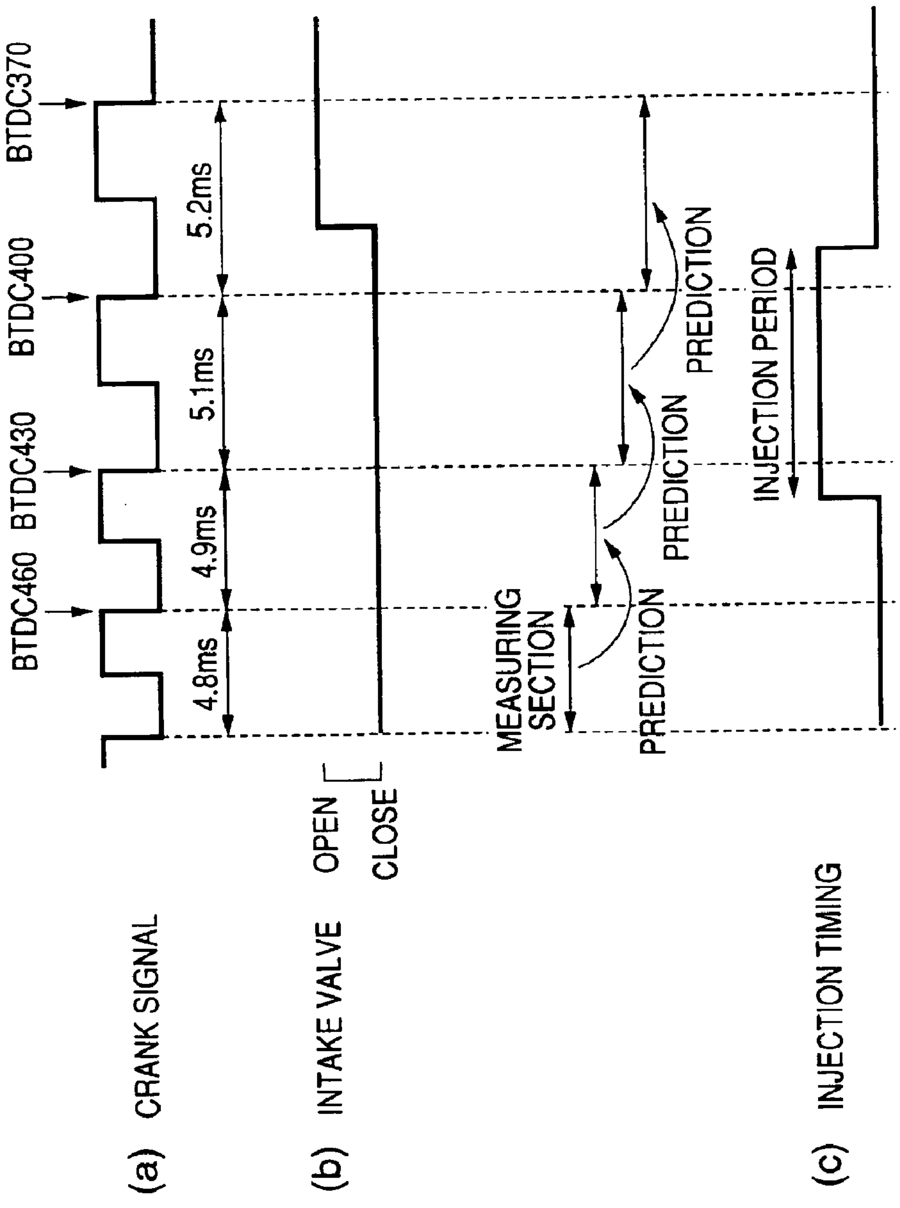
FIG. 13 is a timing chart showing the fuel injection amount control of a fuel injection control apparatus in accordance with another embodiment of the present invention.
Figure 14:
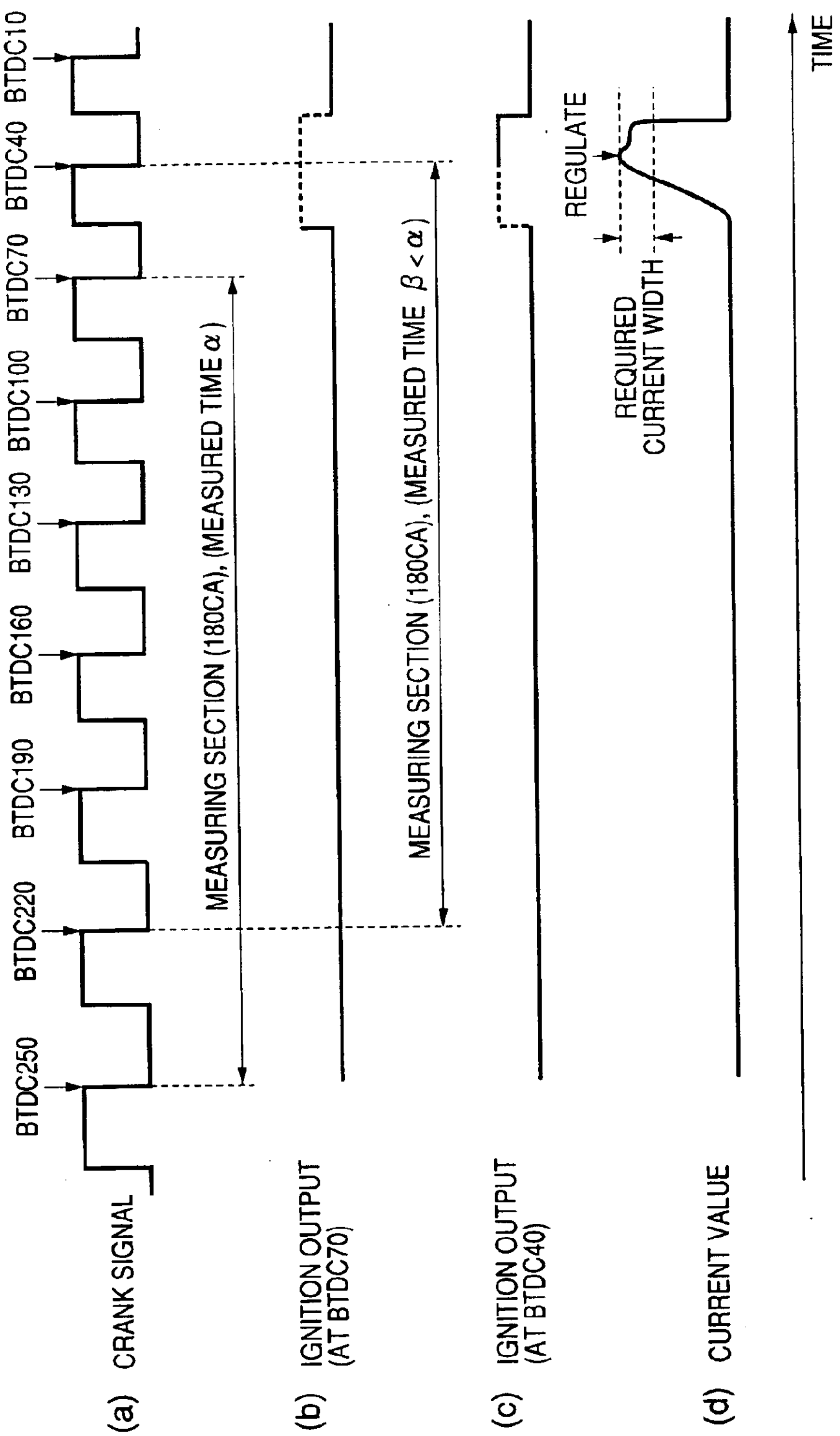
FIG. 14 is a timing chart showing a conventional ignition timing control in an accelerating condition.
Figure 15:
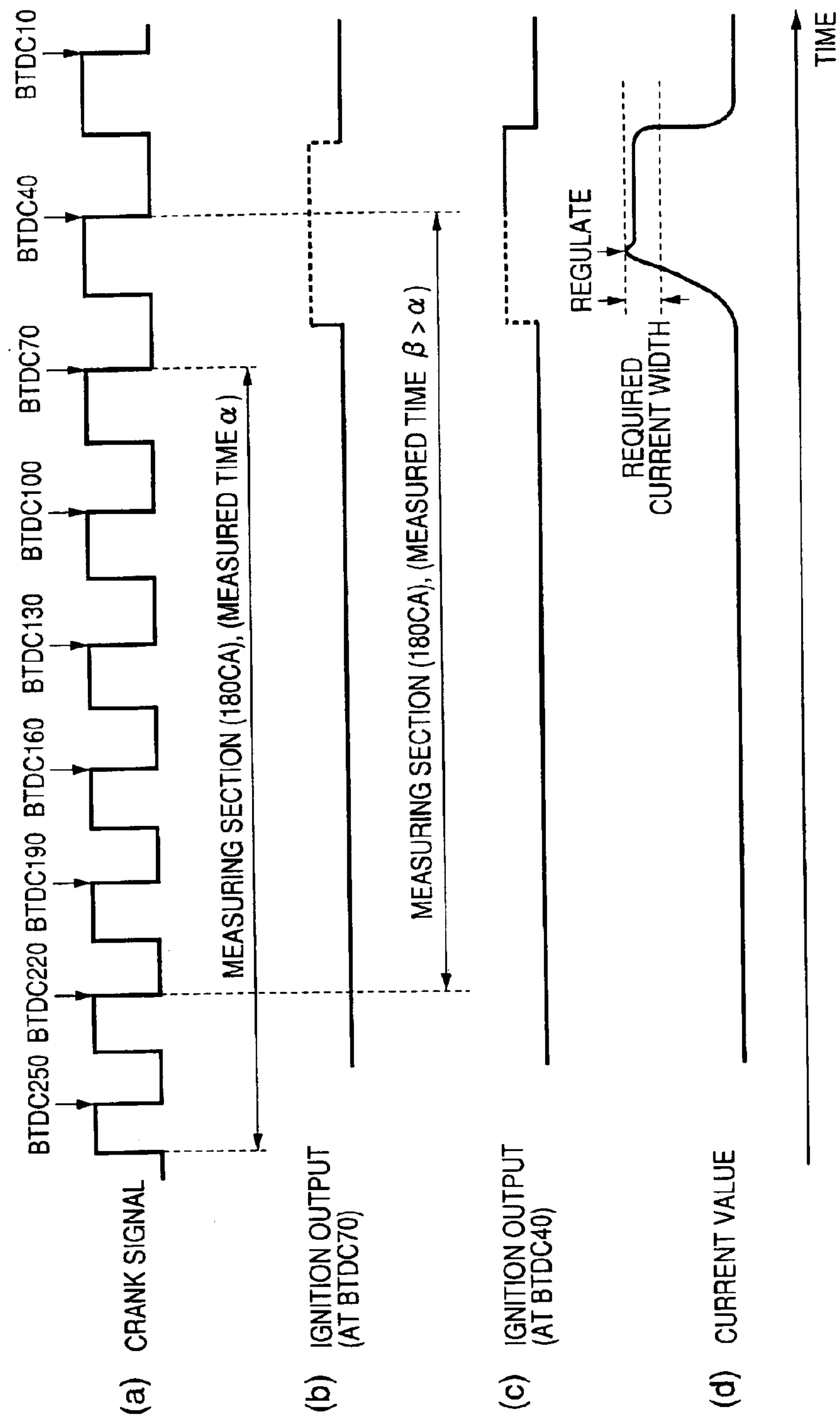
FIG. 15 is a timing chart showing a conventional ignition timing control in a decelerating condition.

The control apparatus for an internal combustion engine in accordance with the present invention calculates a requisite time required for the crank shaft of an internal combustion engine to rotate from the present crank angle to a designated crank angle where the control apparatus controls a predetermined device of the engine. However, the control apparatus for an internal combustion engine in accordance with the present invention is not limited to a control apparatus for an ignition device. For example, as shown in FIG. 13, it is possible to embody this invention as a control apparatus for a fuel injection apparatus. The control apparatus injects fuel into an intake port of an internal combustion engine. In this case, to optimize the combustion efficiency, the control apparatus terminates the fuel injection immediately before the intake stroke begins. The fuel injection termination timing is an important parameter in executing the fuel injection operation appropriately. According to the present invention, it is possible to accurately calculate a requisite time for the fuel injection control.

Furthermore, the internal combustion engine is not limited to a 4-cylinder engine. For example, the present invention can be embodied as a control apparatus for a fuel injection system of a diesel engine.

What is claimed is:

1. A control apparatus for an internal combustion engine that calculates a requisite time required for a crank shaft of an internal combustion engine to rotate from a present crank angle to a designated crank angle where said control apparatus controls a predetermined device of said engine, said control apparatus comprising:

measuring means for measuring a time required for a predetermined rotation of said crank shaft based on a crank signal representing said crank angle; and calculating means for calculating said requisite time by predicting a relationship between times required for said crank shaft to rotate consecutive angular regions positioned before and after said present crank angle based on measurement result obtained by said measuring means with respect to times required for said crank shaft to rotate consecutive angular regions positioned before and after a preceding crank angle advanced a predetermined amount from said present crank angle.

2. The control apparatus for an internal combustion engine in accordance with claim 1, wherein said preceding crank angle advanced a predetermined amount from said present crank angle is a crank angle leading said present crank angle by an amount equivalent to M times (M is a predetermined integer) an angular offset between top dead centers of respective cylinders of said engine.

3. The control apparatus for an internal combustion engine in accordance with claim 1, wherein said preceding crank angle advanced a predetermined amount from said present crank angle is a crank angle leading said present crank angle by an amount equivalent to M×360° (M is a predetermined integer).

4. The control apparatus for an internal combustion engine in accordance with claim 1, wherein said preceding crank angle advanced a predetermined amount from said present crank angle is a crank angle leading said present crank angle by an amount equivalent to M×720° (M is a predetermined integer).

5. The control apparatus for an internal combustion engine in accordance with claim 1, wherein said measuring means measures a time required for each equiangular rotation of said crank shaft, said calculating means successively calculates a ratio of times of consecutive equiangular rotations of said crank shaft which are time sequentially measured, and said calculating means calculates said requisite time based on said ratio of times being successively calculated as well as a time required for the equiangular rotation of said crank shaft ending at said present crank angle.

6. The control apparatus for an internal combustion engine in accordance with claim 5, wherein said calculating means stores data defining a relationship between a time required for each equiangular rotation of the crank shaft in a startup condition of said engine that is measured by said measuring means and a predicted time required for the next equiangular rotation of the crank shaft, and said calculating means calculates said requisite time based on a time required for said equiangular rotation of said crank shaft ending at said present crank angle as well as said stored data when said engine is in the startup condition.

7. The control apparatus for an internal combustion engine in accordance with claim 6, wherein said calculating means calculates said requisite time with reference to at least one factor selected from the group consisting of a temperature of cooling water used for cooling said engine, a voltage of a battery supplying electric power to a starter used in the startup condition of said engine, and an electric power charged in said battery.

8. The control apparatus for an internal combustion engine in accordance with claim 1, wherein said predetermined device is an ignition device and said designated crank angle is set to a cutoff timing at which said control apparatus stops a power supply control for said ignition device.

9. The control apparatus for an internal combustion engine in accordance with claim 8, wherein said requisite time is not calculated again after said power supply control resumes at a predetermined timing determined based on said cutoff timing of said power supply control.

10. The control apparatus for an internal combustion engine in accordance with claim 1, wherein said predetermined device is a fuel injection apparatus and said designated crank angle is set to an injection termination timing of said fuel injection apparatus.

11. The control apparatus for an internal combustion engine in accordance with claim 1, wherein said measuring means measures a time required for each equiangular rotation of said crank shaft, said calculating means successively calculates a ratio of times of consecutive equiangular rotations of said crank shaft which are time sequentially measured, and said calculating means calculates said requisite time based on said ratio of times being successively calculated as well as a time required for the equiangular rotation of said crank shaft ending at said present crank angle.

12. The control apparatus for an internal combustion engine in accordance with claim 11, wherein said calculating means stores data defining a relationship between a time required for each equiangular rotation of the crank shaft in a startup condition of said engine that is measured by said measuring means and a predicted time required for the next equiangular rotation of the crank shaft, and said calculating means calculates said requisite time based on a time required for said equiangular rotation of said crank shaft ending at said present crank angle as well as said stored data when said engine is in the startup condition.

13. The control apparatus for an internal combustion engine in accordance with claim 12, wherein said calculating means calculates said requisite time with reference to at least one factor selected from the group consisting of a temperature of cooling water used for cooling said engine, a voltage of a battery supplying electric power to a starter used in the startup condition of said engine, and an electric power charged in said battery.

14. A control apparatus for an internal combustion engine that calculates a requisite time required for a crank shaft of an internal combustion engine to rotate from a present crank angle to a designated crank angle where said control apparatus controls a predetermined device of said engine, said control apparatus comprising:

measuring means for measuring a time required for a predetermined rotation of said crank shaft based on a crank signal representing said crank angle; and calculating means for calculating said requisite time based on measurement result obtained by said measuring means, including first time information representing a time required for said crank shaft to rotate a first angle ending at a preceding crank angle that is advanced a predetermined amount from said present crank angle, second time information representing a time required for said crank shaft to rotate a second angle starting from said preceding crank angle and corresponding to a rotation from said present crank angle to said designated crank angle, and third time information representing a time required for said crank shaft to rotate a third angle corresponding to said first angle and ending at said present crank angle.

15. The control apparatus for an internal combustion engine in accordance with claim 14, further comprising means for executing a fuel cut control, wherein said calculating means prohibits obtaining new time information from said measuring means when said fuel cut control is executed, and retains said first time information and said second time information which is obtained before executing said fuel cut control.

16. The control apparatus for an internal combustion engine in accordance with claim 14, wherein said preceding crank angle advanced a predetermined amount from said present crank angle is a crank angle leading said present crank angle by an amount equivalent to M times (M is a predetermined integer) an angular offset between top dead centers of respective cylinders of said engine.

17. The control apparatus for an internal combustion engine in accordance with claim 14, wherein said preceding crank angle advanced a predetermined amount from said present crank angle is a crank angle leading said present crank angle by an amount equivalent to $M \times 360°$ (M is a predetermined integer).

18. The control apparatus for an internal combustion engine in accordance with claim 14, wherein said preceding crank angle advanced a predetermined amount from said present crank angle is a crank angle leading said present crank angle by an amount equivalent to $M \times 720°$ (M is a predetermined integer).

19. The control apparatus for an internal combustion engine in accordance with claim 14, wherein said predetermined device is an ignition device and said designated crank angle is set to a cutoff timing at which said control apparatus stops a power supply control for said ignition device.

20. The control apparatus for an internal combustion engine in accordance with claim 19, wherein said requisite time is not calculated again after said power supply control resumes at a predetermined timing determined based on said cutoff timing of said power supply control.

21. The control apparatus for an internal combustion engine in accordance with claim 14, wherein said predetermined device is a fuel injection apparatus and said designated crank angle is set to an injection termination timing of said fuel injection apparatus.

* * * * *